US011927762B2

(12) United States Patent
Eash et al.

(10) Patent No.: US 11,927,762 B2
(45) Date of Patent: Mar. 12, 2024

(54) STEERABLE POSITIONING ELEMENT

(71) Applicant: Avegant Corp., San Mateo, CA (US)

(72) Inventors: Aaron Matthew Eash, San Francisco, CA (US); Andrew John Gross, Chassell, MI (US); Christopher David Westra, San Carlos, CA (US); D. Scott Dewald, Dallas, TX (US); Edward Chia Ning Tang, Menlo Park, CA (US); Joseph Roger Battelle, Belmont, CA (US); Kevin William King, San Francisco, CA (US); Warren Cornelius Welch, III, Foster City, CA (US); Eric Richard David Frasch, San Francisco, CA (US); David A. Henderson, Farmington, NY (US); Qin Xu, Pittsford, NY (US)

(73) Assignee: Avegant Corp., San Mateo, CA (US)

(*) Notice: Subject to any disclaimer, the term of this patent is extended or adjusted under 35 U.S.C. 154(b) by 0 days.

(21) Appl. No.: 17/449,943

(22) Filed: Oct. 4, 2021

(65) Prior Publication Data
US 2022/0099982 A1 Mar. 31, 2022

Related U.S. Application Data

(63) Continuation of application No. 16/706,613, filed on Dec. 6, 2019, now Pat. No. 11,169,383.
(Continued)

(51) Int. Cl.
G02B 27/01 (2006.01)
F16M 11/12 (2006.01)
(Continued)

(52) U.S. Cl.
CPC ..... *G02B 27/0176* (2013.01); *G02B 27/0093* (2013.01); *G02B 27/0172* (2013.01);
(Continued)

(58) Field of Classification Search
CPC .......... G02B 27/0176; G02B 27/0093; G02B 27/0172; G02B 2027/0127;
(Continued)

(56) References Cited

U.S. PATENT DOCUMENTS 4,924,522 A 5/1990 Bray et al.
5,035,500 A 7/1991 Rorabaugh et al.
(Continued)

FOREIGN PATENT DOCUMENTS

CA 2815461 A1 4/2012
CN 103261943 A 8/2013
(Continued)

OTHER PUBLICATIONS

Milanovic et al., "Sub-100 μs Settling Time and Low Voltage Operation for Gimbal-less Two-Axis Scanners," IEEE/LEOS Optical MEMS 2004, Takamatsu, Japan, Aug. 2004. (Year: 2004).*
(Continued)

*Primary Examiner* — Robert J Hance
(74) *Attorney, Agent, or Firm* — Nicholson De Vos Webster & Elliott LLP; Judith Szepesi

(57) ABSTRACT

A display system comprising a steerable display having a monocular field of view of at least 1 degree, positioned within a scannable field of view of at least 20 degrees, the steerable display positioned for a user. In one embodiment, the steerable display is positioned for the user's fovea.

21 Claims, 13 Drawing Sheets

Related U.S. Application Data

(60) Provisional application No. 62/902,377, filed on Sep. 18, 2019, provisional application No. 62/777,061, filed on Dec. 7, 2018.

(51) Int. Cl.
*G02B 27/00* (2006.01)
*G06F 3/01* (2006.01)
*G06F 3/147* (2006.01)

(52) U.S. Cl.
CPC ............. *G06F 3/013* (2013.01); *G06F 3/147* (2013.01); *F16M 11/123* (2013.01); *G02B 2027/0127* (2013.01); *G02B 2027/0187* (2013.01)

(58) Field of Classification Search
CPC . G02B 2027/0187; G06F 3/013; G06F 3/147; F16M 11/123; F16M 11/18
See application file for complete search history.

(56) References Cited

U.S. PATENT DOCUMENTS

| | | | |
|---|---|---|---|
| 6,008,781 A | 12/1999 | Furness et al. | |
| 6,097,353 A | 8/2000 | Melville et al. | |
| 6,275,326 B1* | 8/2001 | Bhalla ................ | G02B 26/0841 359/224.1 |
| 6,353,503 B1 | 3/2002 | Spitzer et al. | |
| 6,356,392 B1 | 3/2002 | Spitzer | |
| 6,411,751 B1* | 6/2002 | Giles ................... | G02B 6/3588 385/16 |
| 7,009,752 B1* | 3/2006 | Lorell ................. | G02B 7/1821 359/290 |
| 7,786,648 B2 | 8/2010 | Xu et al. | |
| 8,203,702 B1* | 6/2012 | Kane ................... | G02B 26/0833 356/139.05 |
| 9,128,281 B2 | 9/2015 | Osterhout et al. | |
| 9,335,548 B1 | 5/2016 | Cakmakci et al. | |
| 9,588,408 B1 | 3/2017 | Linnell | |
| 9,710,887 B1 | 7/2017 | Sahlsten et al. | |
| 9,711,072 B1 | 7/2017 | Konttori et al. | |
| 9,711,114 B1 | 7/2017 | Konttori et al. | |
| 9,779,478 B1 | 10/2017 | Wilson et al. | |
| 9,972,071 B2 | 5/2018 | Wilson et al. | |
| 10,140,695 B2 | 11/2018 | Wilson et al. | |
| 10,255,714 B2 | 4/2019 | Mitchell et al. | |
| 10,284,118 B2 | 5/2019 | Henderson et al. | |
| 10,504,207 B1 | 12/2019 | Wilson et al. | |
| 10,514,546 B2 | 12/2019 | Eash et al. | |
| 11,209,650 B1 | 12/2021 | Trail | |
| 2002/0005976 A1* | 1/2002 | Behin .................. | B81C 1/0015 359/254 |
| 2008/0015553 A1 | 1/2008 | Zacharias | |
| 2009/0122385 A1 | 5/2009 | Hilton | |
| 2009/0160872 A1 | 6/2009 | Gibbons | |
| 2009/0189830 A1* | 7/2009 | Deering ............... | G09G 3/02 345/1.3 |
| 2010/0097580 A1 | 4/2010 | Yamamoto et al. | |
| 2010/0149073 A1* | 6/2010 | Chaum ............... | G02B 27/0075 345/8 |
| 2010/0231706 A1 | 9/2010 | Maguire, Jr. | |
| 2011/0075257 A1 | 3/2011 | Hua et al. | |
| 2011/0141225 A1 | 6/2011 | Stec et al. | |
| 2011/0285967 A1* | 11/2011 | Gollier ................ | H04N 9/3129 353/38 |
| 2012/0120498 A1 | 5/2012 | Harrison et al. | |
| 2012/0154277 A1 | 6/2012 | Bar-Zeev et al. | |
| 2012/0176483 A1 | 7/2012 | Border et al. | |
| 2013/0100176 A1 | 4/2013 | Lewis et al. | |
| 2013/0114146 A1 | 5/2013 | Larson | |
| 2013/0208003 A1 | 8/2013 | Bohn et al. | |
| 2013/0208330 A1 | 8/2013 | Naono | |
| 2013/0286053 A1 | 10/2013 | Fleck et al. | |
| 2014/0049643 A1* | 2/2014 | Segerstrom ............ | F21V 21/30 250/234 |
| 2014/0300859 A1 | 10/2014 | Oz | |
| 2015/0173846 A1* | 6/2015 | Schneider .......... | A61B 1/00042 600/424 |
| 2015/0201171 A1 | 7/2015 | Takehana | |
| 2015/0247723 A1 | 9/2015 | Abovitz et al. | |
| 2015/0287165 A1 | 10/2015 | Berghoff | |
| 2016/0026253 A1 | 1/2016 | Bradski et al. | |
| 2016/0033771 A1 | 2/2016 | Tremblay et al. | |
| 2016/0065921 A1 | 3/2016 | Sieler et al. | |
| 2016/0077338 A1 | 3/2016 | Robbins et al. | |
| 2016/0131912 A1 | 5/2016 | Border et al. | |
| 2016/0209648 A1 | 7/2016 | Haddick et al. | |
| 2016/0225192 A1 | 8/2016 | Jones et al. | |
| 2016/0233793 A1 | 8/2016 | Henderson et al. | |
| 2016/0240013 A1 | 8/2016 | Spitzer | |
| 2016/0260258 A1 | 9/2016 | Lo et al. | |
| 2016/0262608 A1 | 9/2016 | Krueger | |
| 2016/0267716 A1 | 9/2016 | Patel | |
| 2016/0274365 A1 | 9/2016 | Bailey et al. | |
| 2016/0327789 A1 | 11/2016 | Klug et al. | |
| 2016/0363841 A1 | 12/2016 | Hino et al. | |
| 2016/0379606 A1 | 12/2016 | Kollin et al. | |
| 2017/0083084 A1 | 3/2017 | Tatsuta et al. | |
| 2017/0124760 A1 | 5/2017 | Murakawa et al. | |
| 2017/0188021 A1 | 6/2017 | Lo et al. | |
| 2017/0245753 A1 | 8/2017 | Donaldson | |
| 2017/0255012 A1 | 9/2017 | Tam et al. | |
| 2017/0255020 A1 | 9/2017 | Tam et al. | |
| 2017/0255766 A1 | 9/2017 | Kaehler | |
| 2017/0263046 A1 | 9/2017 | Patney et al. | |
| 2017/0287446 A1 | 10/2017 | Young et al. | |
| 2017/0287447 A1 | 10/2017 | Barry et al. | |
| 2017/0316601 A1 | 11/2017 | Kakarlapudi et al. | |
| 2017/0318235 A1 | 11/2017 | Schneider et al. | |
| 2018/0003962 A1 | 1/2018 | Urey et al. | |
| 2018/0031849 A1* | 2/2018 | Omanovic ............ | B60K 35/00 |
| 2018/0096471 A1 | 4/2018 | Wilson et al. | |
| 2018/0136471 A1 | 5/2018 | Miller et al. | |
| 2018/0136473 A1 | 5/2018 | Cobb et al. | |
| 2018/0174451 A1 | 6/2018 | Rao | |
| 2018/0183356 A1 | 6/2018 | Henderson et al. | |
| 2018/0227630 A1 | 8/2018 | Schmidt et al. | |
| 2018/0267294 A1 | 9/2018 | Aschwanden et al. | |
| 2018/0269266 A1 | 9/2018 | Cancel et al. | |
| 2018/0275410 A1 | 9/2018 | Yeoh et al. | |
| 2018/0284451 A1 | 10/2018 | Eash et al. | |
| 2018/0293041 A1 | 10/2018 | Harviainen | |
| 2018/0321484 A1 | 11/2018 | Bailey et al. | |
| 2018/0344413 A1 | 12/2018 | Rappel et al. | |
| 2019/0041524 A1* | 2/2019 | Korsgaard Jensen ...................... G01S 7/4817 | |
| 2019/0049721 A1 | 2/2019 | Anton et al. | |
| 2019/0179149 A1 | 6/2019 | Curtis et al. | |
| 2020/0018965 A1 | 1/2020 | Milner-Moore et al. | |
| 2020/0133006 A1 | 4/2020 | Eash et al. | |
| 2020/0271932 A1 | 8/2020 | Tuomisto et al. | |
| 2021/0293931 A1* | 9/2021 | Nemet .................. | G01S 7/4813 |

FOREIGN PATENT DOCUMENTS

| | | | |
|---|---|---|---|
| CN | 107392989 A | 11/2017 | |
| CN | 107852521 A | 3/2018 | |
| CN | 108474949 A | 8/2018 | |
| EP | 1970887 A1 | 9/2008 | |
| GB | 2510001 A * | 7/2014 | ............. G01J 3/021 |
| JP | 08-313843 A | 11/1996 | |
| JP | 2001-281594 | 10/2001 | |
| JP | 2007-171228 A | 7/2007 | |
| JP | 2009-182754 A | 8/2009 | |
| JP | 2014-511512 A | 5/2014 | |
| JP | 2015-503934 A | 2/2015 | |
| JP | 2017-028510 A | 2/2017 | |
| JP | 2017-534075 A | 11/2017 | |
| KR | 10-2017-0055992 A | 5/2017 | |
| KR | 10-2018-0104056 A | 9/2018 | |
| WO | WO-2009131626 A2 * | 10/2009 | ......... G02B 27/0172 |
| WO | 2012/082807 A2 | 6/2012 | |

(56) References Cited

FOREIGN PATENT DOCUMENTS

| WO | 2013/035086 A1 | 3/2013 | |
|---|---|---|---|
| WO | WO-2017113117 A1 * | 7/2017 | ............. G02B 27/01 |
| WO | 2018/019831 A1 | 2/2018 | |
| WO | 2018/165484 A1 | 9/2018 | |
| WO | 2018/175625 A1 | 9/2018 | |
| WO | 2018/183405 A1 | 10/2018 | |
| WO | 2019/104046 A1 | 5/2019 | |

OTHER PUBLICATIONS

European Search Report and Search Opinion, EP App. No. 19893448.1, dated Jul. 27, 2022, 7 pages.
Notice of Reasons for Refusal, JP App. No. 2019-553025, dated Mar. 2, 2022, 11 pages (6 pages of English Translation and 5 pages of Original Document).
Non Final Office Action, U.S. Appl. No. 16/835,032, dated Jun. 6, 2022, 13 pages.
Non-Final Office Action, U.S. Appl. No. 16/706,613, dated Apr. 1, 2021, 10 pages.
Notice of Allowance, U.S. Appl. No. 16/706,613, dated Sep. 2, 2021, 6 pages.
PCT Search Report PCT/US2019/065101, dated Apr. 8, 2020, 4 pages.
PCT Written Opinion PCT/US19/65101, dated Apr. 8, 2020, 9 pages.
First Office Action, CN App. No. 201980080626.9, dated Aug. 23, 2023, 24 pages (12 pages of English Translation and 12 pages of Original Document).
Office Action, JP App. No. 2021-532370, dated Nov. 13, 2023, 09 pages (5 pages of English Translation and 4 pages of Original Document).

* cited by examiner

STEERABLE POSITIONING ELEMENT

RELATED APPLICATIONS

The present application is a continuation of U.S. application Ser. No. 16/706,613 filed on Dec. 6, 2019, which application claims priority to U.S. Provisional Patent Application No. 62/777,061, filed on Dec. 7, 2018, and U.S. Provisional Patent Application 62/902,377, filed on Sep. 18, 2019, and incorporates all applications by reference in their entirety.

FIELD OF THE INVENTION

The present application relates to near-eye display systems, and in particular to a steerable positioning element in a near-eye display.

BACKGROUND

Near-eye displays have the competing requirements of displaying images at a high resolution, over a large field of view (FOV). For many applications in virtual and augmented reality, the field of view should be greater than 90 degrees, and ideally the binocular field of view would extend past 180 degrees. At the same time, the resolution of the display should match that of the human visual system so that little or no pixelation is perceived in the virtual images. Combining these two requirements in a single system presents a number of challenges. To avoid the appearance of pixelation, the resolution needs to be on the order of 0.01-0.02 degrees per pixel. Over a 90-degree square field of view, this corresponds to 4.5 k×4.5 k pixels per eye or higher. Achieving such resolutions is challenging at the level of the panel, the drive electronics, and the rendering pipeline.

Additionally, optical systems that can project wide FOV images to the user with sufficiently high resolution over the entire field of view are also difficult to design. Systems architectures that are able to present the user with high resolution images over a wide field of view, while simultaneously reducing the rendering, data rate, and panel requirements will enable new applications for augmented and virtual reality systems.

LIST OF FIGURES

The present invention is illustrated by way of example, and not by way of limitation, in the figures of the accompanying drawings and in which like reference numerals refer to similar elements and in which.

DETAILED DESCRIPTION

The present application discloses a steerable positioning element which may be used to enable a steerable display. In one embodiment, the steerable positioning element may be a mirror, lens, prism, dichroic mirror, switchable crystal or other positioning element. The steerable display in one embodiment is designed to be positionable to provide a high resolution display in the area where the user's fovea is located. The "fovea" is the small depression in the retina of the eye where visual acuity is highest. In another embodiment, the steerable display may be positioned to provide a heads-up display, or a sprite, in a particular location. The location may be based on the user's surroundings, the user's gaze, other external data, or another factor. The steerable display may be used in a virtual reality and/or an augmented reality display, in one embodiment. The steerable display may also be used for any other purpose, in which a high resolution display is designed to be positioned.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1A:
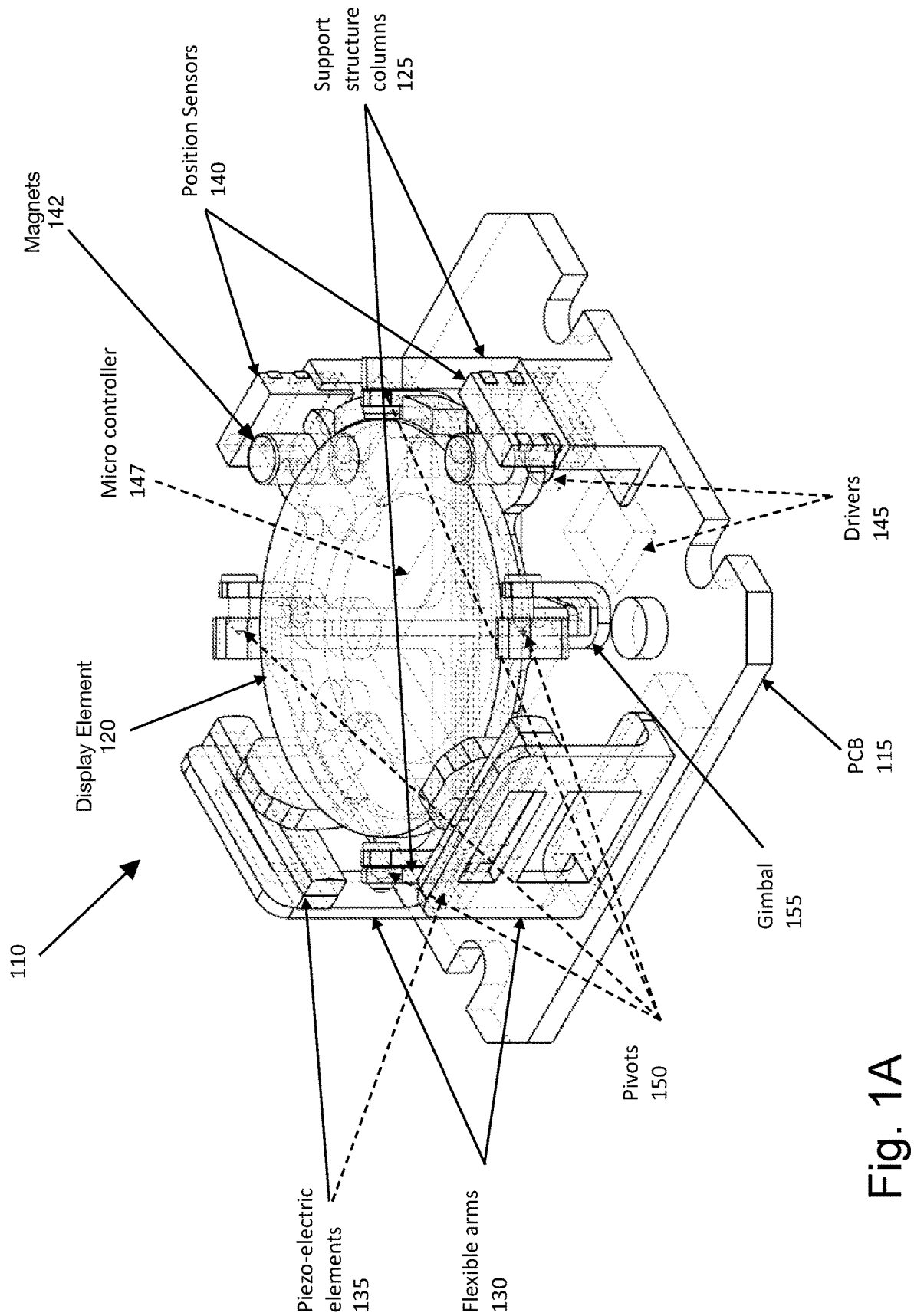
FIG. 1A is an illustration of a first embodiment of a steerable positioning element.

FIG. 1A illustrates one embodiment of a steerable positioning element. In one embodiment, the system 110 includes display element 120 supported by gimbals 155 and support structure columns 125.

The display element 120 may pivot along two axes. In one embodiment, the system includes two gimbals 155, each of which provides pivoting along one axis. The pivoting of the display element 120 is controlled by the piezoelectric elements 135 mounted to flexible arms 130, acting as the X-axis controller and the Y-axis controller. In one embodiment the flexible arms 130 are made of metal. In one embodiment, the flexible arms support the piezoelectric elements 135. The flexible arms 130 provide a static force against the side of the assembly, to ensure that piezoelectric elements 135 apply a force normal to the driving surface of the display element 120 as the piezoelectric element 135 is actuating and remains in contact with the display element 120 when at rest.

In one embodiment, the range of motion of the display element 120 may be +/−10 degrees along both the X and Y axis. The drivers 145 drive the piezoelectric elements 135 to control motion.

In one embodiment, microcontroller 147 receives control data from the system, and controls the drivers 145 to drive the piezoelectric elements 135, to move the display element 120.

In one embodiment, position sensor 140 is used to verify the actual position of the display element 120. In one embodiment, position sensor 140 may be one or more magnetic sensors which can sense the relative change in a magnetic field of one or more magnets associated with the display device. In one embodiment the magnets are positioned near the outer diameter of the display element 120. In one embodiment, two magnets are positioned 90 degrees apart radially. In one embodiment, the magnets and associated magnetic sensors are positioned opposite the drive surfaces. This provides minimal cross-coupling, and the most accurate measurement.

In one embodiment, the weight of the drive element is balanced by the weight of the magnet on the display element 120. The magnets may be rare earth magnets, in one embodiment. The magnetic sensors are placed in close proximity to the magnets. In another embodiment, four magnets may be used. In one embodiment, in a four magnet configuration two magnets are positioned opposite the drive elements and two additional magnets are placed further away from the display element. This adds more mass to the system, but provides the ability to cancel other magnetic fields in the space, including the earth's magnetic field, for more accurate measurement of the changes in the magnetic field based on the movement of the display element 120. In one embodiment, the magnetic sensors are Hall effect sensors. In one embodiment, the magnetic sensors are magnetometers.

In one embodiment, one or more additional magnetic sensors are used to measure the earth's magnetic field, or other ambient magnetic fields. In one embodiment, the impact of the ambient magnetic fields are subtracted, to negate its impacts on the display element position measurements. In one embodiment, the additional sensors are oriented to be approximately aligned with the measurement sensors on the assembly. In one embodiment, a single 3-axis magnetic sensor may be used. In one embodiment, a differential sensor may be used.

In one embodiment, the calculation comparing the actual position to the instructed position occurs on a processor, as will be described with respect to FIG. 2. In another embodiment, the positioning element may be controlled using an analog control circuit, that does not utilize a microcontroller 147.

The display element 120 may be a mirror, lens, prism, holographic optical element (HOE), liquid crystal polymer, and/or another element utilized in directing light for a steerable display. In one embodiment, the display element 120 may be a Fresnel reflector, diffractive element, surface relief grating, light guide, wave guide, or volume hologram.

In one embodiment, piezo-electric elements 135 are actuators to move the display element 120. Alternatively, the piezo-electric elements 135 may be replaced magnetic and/or inductive elements, nanomotors, electrostatic elements, or other devices which enable the movement of the display element 120 with the precision and speed needed for a display system.

Figure 1B:
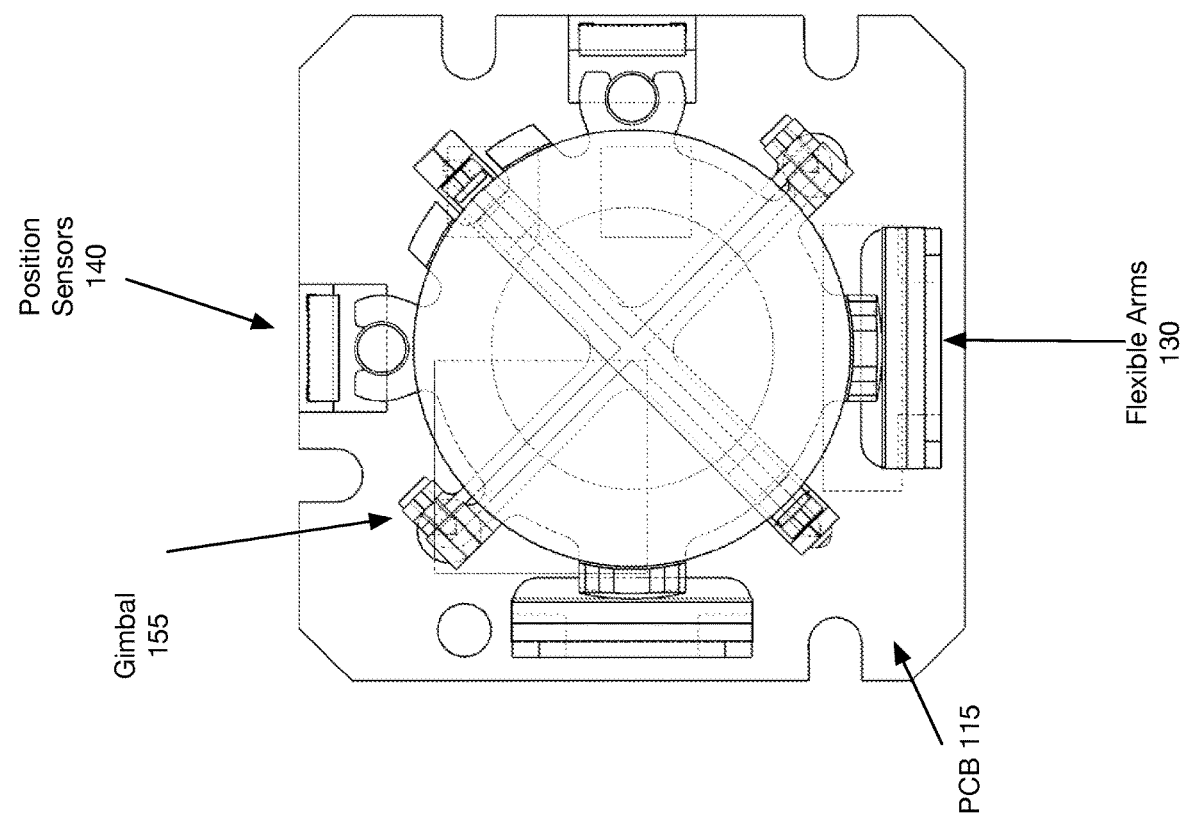
FIGS. 1B and 1C are a perspective view and a cross-section of another embodiment of a steerable positioning element.

FIG. 1B is a top view of the steerable positioning element of FIG. 1A.

Figure 1C:
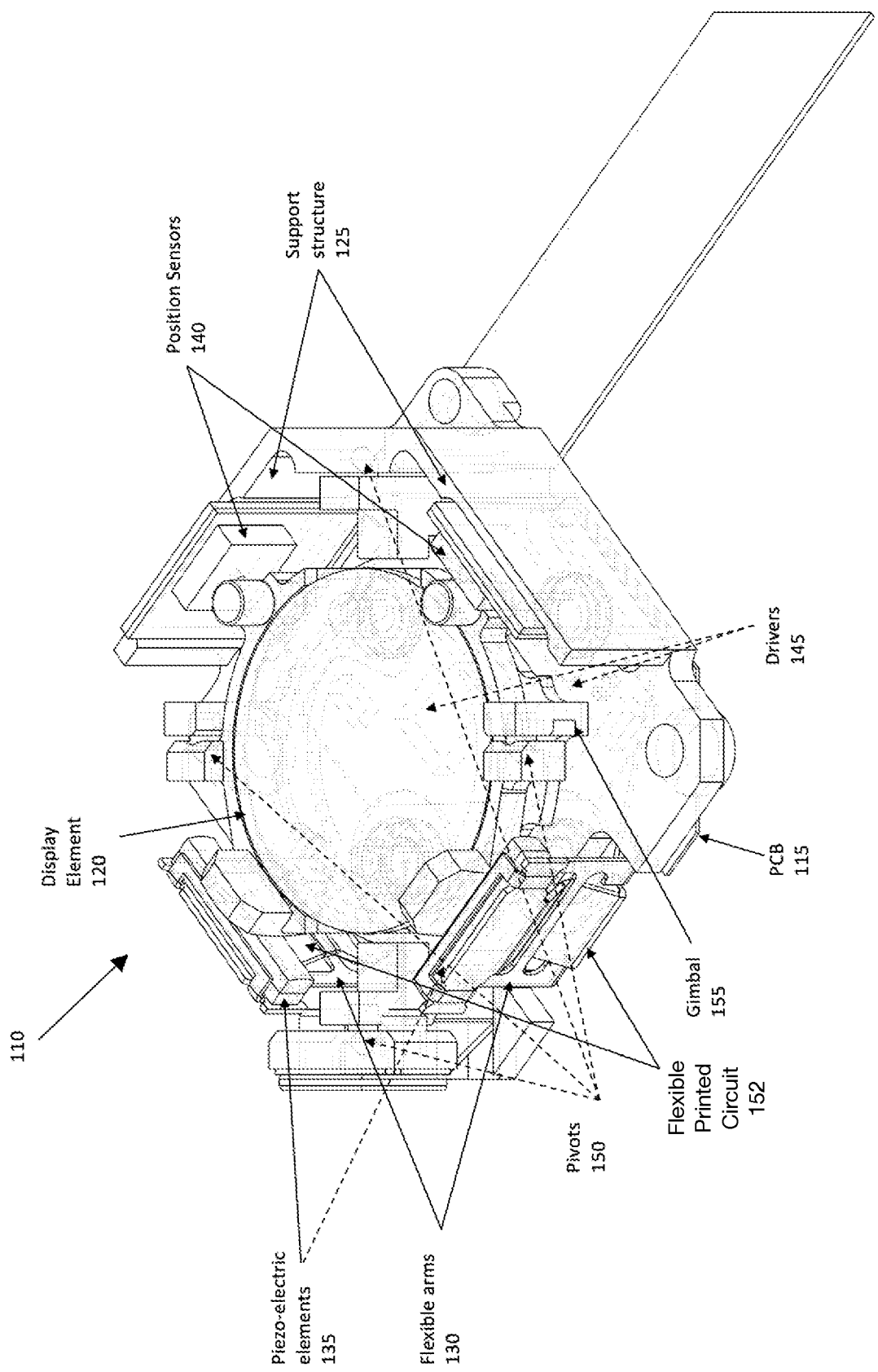

FIG. 1C is another embodiment of the steerable positioning element, in which a flexible printed circuit board 152 is added, and the microcontroller is moved to a separate board. In one embodiment, the flexible printed circuit board 152 weaves in, as shown. This makes the steerable positioning element a little lighter.

The tables below illustrate exemplary configurations of the optical and physical characteristics of one embodiment of the steerable positioning element. Note that while these tables show measurements, and in some instances ranges of a preferred embodiment, variations from these ranges, and especially additional precision, may be preferred when possible. Additionally, while some ranges are provided, the system is not limited to these ranges, in one embodiment.

In one embodiment, a system may include two mirrors.

In one embodiment, a fast moving element may be designed to match the movement of the eye in speed, with a small angle movement range of 0.3° in 300 µs and a large angle movement range of 2°-20° in 300 µs. Such a fast-moving element may move every frame and can ignore saccades because the movement speed is fast enough, so it is not perceptible by a user.

A medium fast-moving display element in one embodiment also can move every frame, with a small angle movement range of 0.3° in 4 ms and a large angle movement range of 2°-20° in 8 ms-50 ms. In one embodiment, this configuration permits saccades to settle by the time the eye settling time begins.

A medium slow mirror in one embodiment has a small angle movement range of 0.6° in 9 ms and a large angle movement range of 2°-20° in 8 ms-50 ms. In one embodiment, the medium slow mirror moves at approximately the same speed as the medium fast mirror over larger angles, but more slowly over smaller angles. However, even the medium slow mirror in one embodiment can move every frame.

A slow mirror has a small angle movement range of 0.15° in 16 ms and a large angle movement range of 2°-20° in 20 ms-100 ms. Because of its slower speed, the slow mirror utilizes a blank frame during movement, in one embodiment. In one embodiment, the blank frame may be a subframe for displays capable of subframe blanking. In one embodiment, a slow mirror utilizes saccadic masking, and relies on the eye settling time to ensure that the user does not perceive the motion of the display controlled by the mirror.

In one embodiment, the system is designed to move the mirror during the time the display is off. For most OLED based VR displays, the duty cycle is in the range of 20% (that is, the display itself is only on for 20% of the frame time). The steerable display can be moved during the time when the display is off. The specific angles, speeds, and configuration details discussed are of course merely exemplary. A faster, slower, or intermediate mirror having different specifications may be used.

The below tables should be considered exemplary configurations. One of skill in the art would understand that these aspects may be varied without departing from the scope of the invention.

Figure 1D:
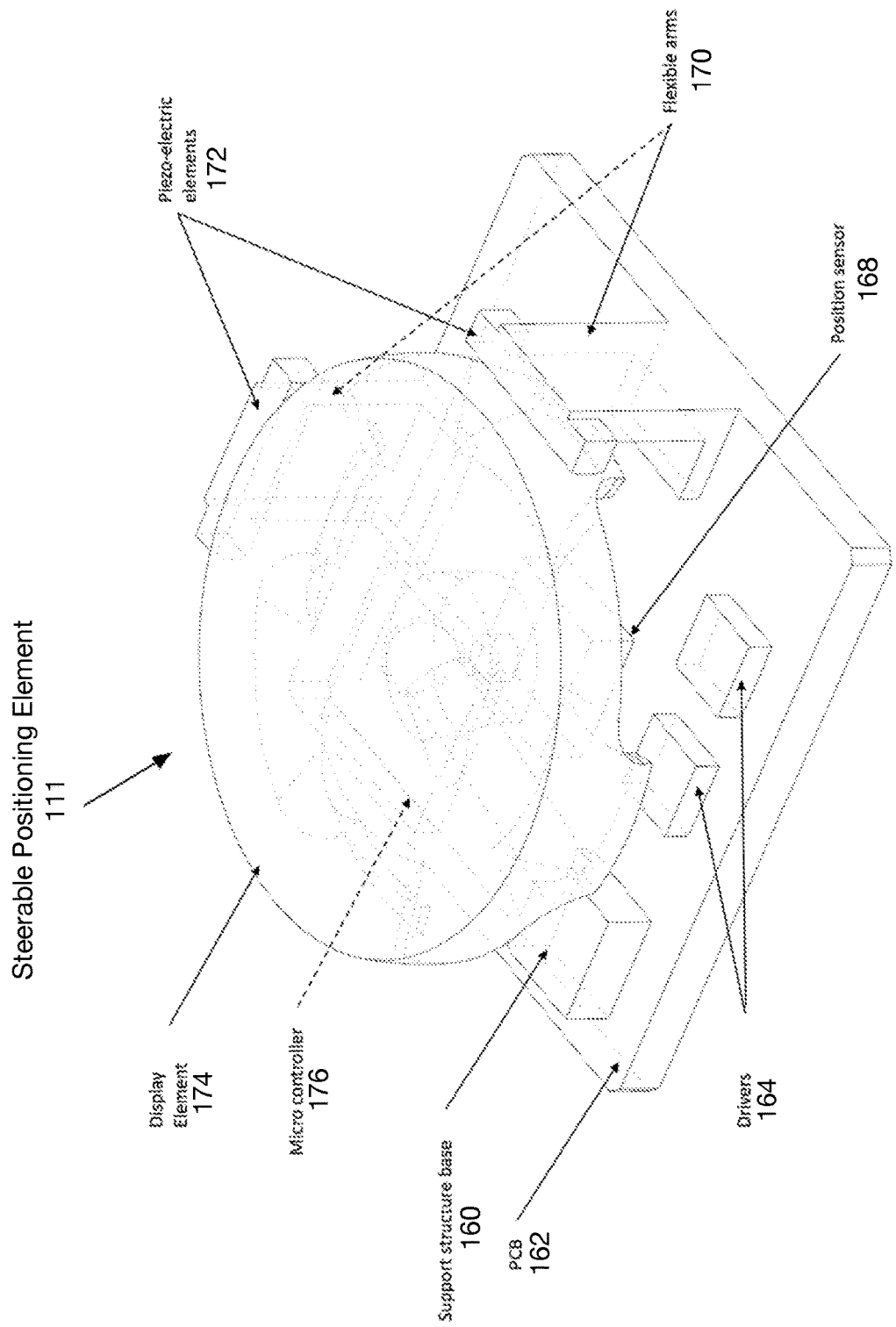
FIG. 1D is an illustration of another embodiment of the steerable positioning element.

FIG. 1D illustrates another embodiment of the steerable positioning element 111. In one embodiment, the system 111 includes display element 174 supported by flexible arms 170 and support structure base 160.

The display element 174 may pivot along two axes. The pivoting of the display element 174 is controlled by the piezoelectric elements 172. In one embodiment, the range of motion may be +/−18 degrees along both the X and Y axis. The drivers 164 drive the piezoelectric elements 172 to control motion.

Microcontroller 176 receives the control data from the system and controls the drivers to move the display element 174. Position sensor 168 is used to verify the actual position of the display element 174. In one embodiment, the calculation comparing the actual position to the instructed position occurs on a processor, as will be described below.

The display element 174 may be a mirror, lens, prism, holographic optical element (HOE), liquid crystal polymer, adjustable mirror, tunable prism, acousto-optical modulator, adjustable display panel, a curved mirror, a diffractive element, a Fresnel reflector and/or another element utilized in directing light for a steerable display. In one embodiment, the display element 174 may be a Fresnel reflector, diffractive element, surface relief grating, light guide, wave guide, or volume hologram.

In one embodiment, piezo-electric elements 172 are actuators to move the display element 174. Alternatively, the piezo-electric elements 172 may be replaced magnetic and/or inductive elements, nanomotors, electrostatic elements, or other devices which enable the movement of the display element 174 with the precision and speed needed for a display system.

Figure 1E:
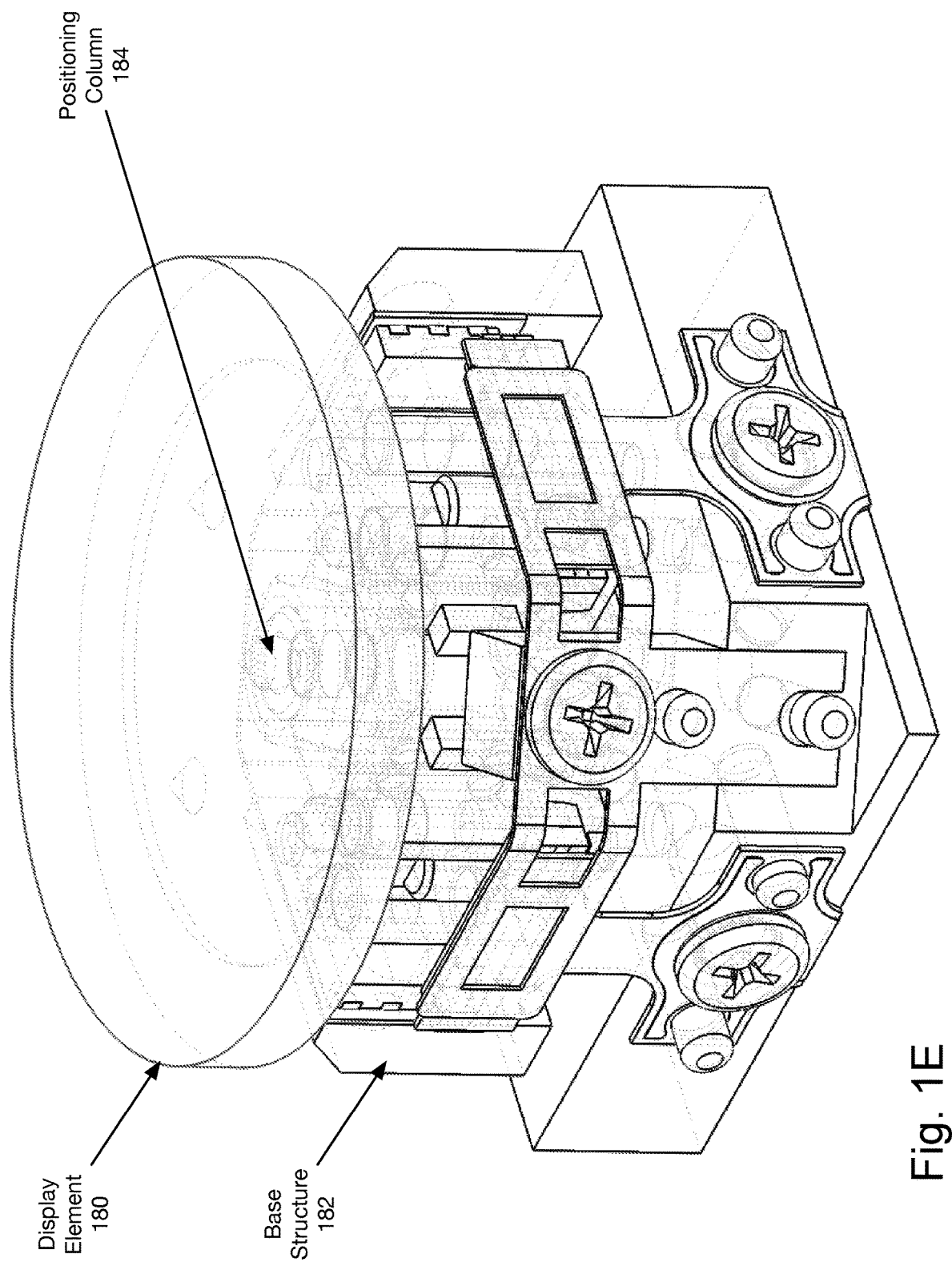
FIG. 1E is an illustration of another element of the steerable positioning element.
Figure 1F:
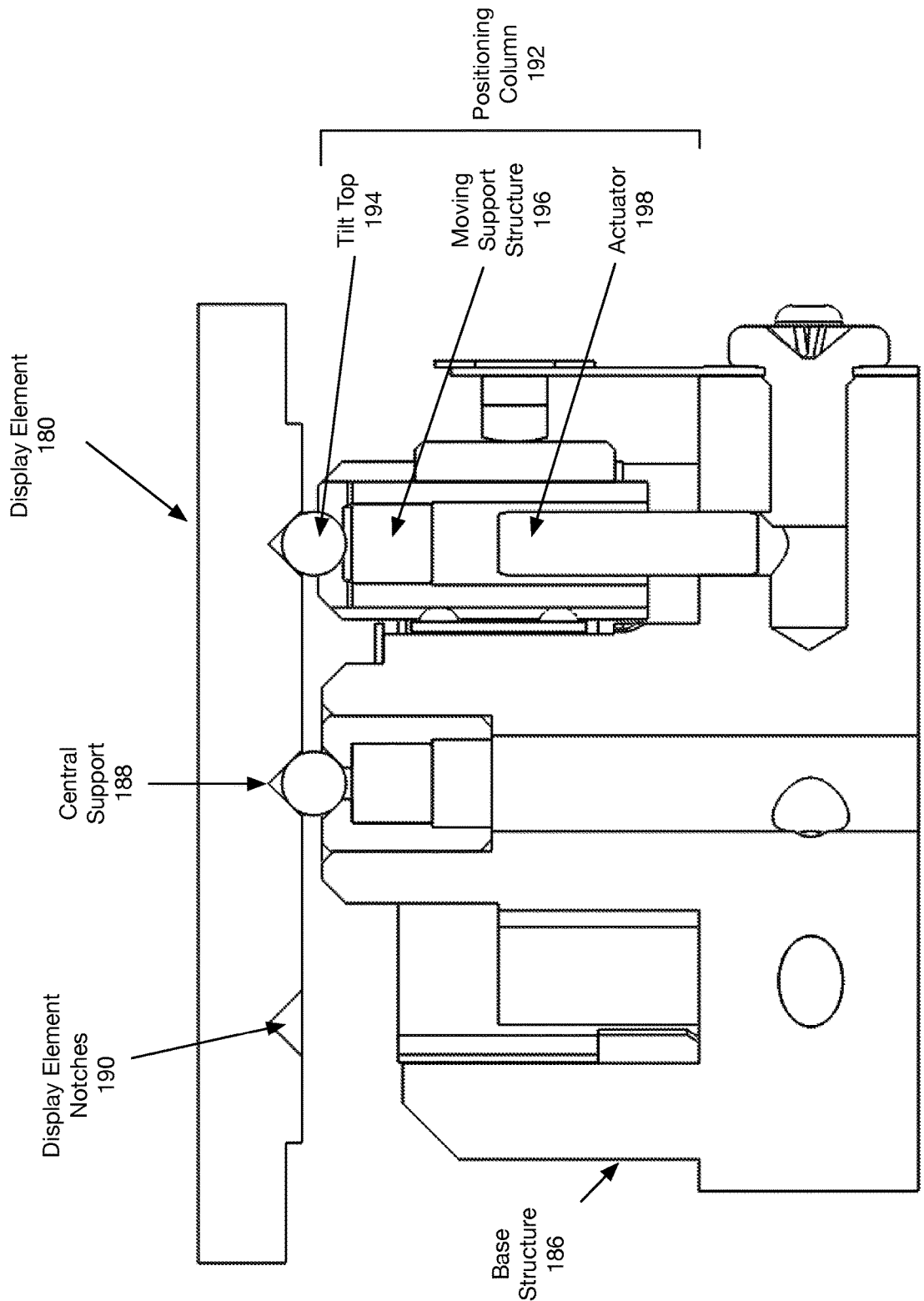
FIG. 1F is a cross-section of the embodiment of FIG. 1E.

FIGS. 1E and 1F are a perspective view and a cross-section of another embodiment of a steerable positioning element. The display element 180 is supported in position by a plurality of positioning columns 184. The positioning columns 185 enable the movement of the display element 180. The positioning columns 185 are supported by base structure 182. Although not shown, this embodiment also includes a microcontroller and position sensor.

The cross-section in FIG. 1F shows the elements of the positioning columns 185 and the central support 188, of the embodiment of FIG. 1E. In one embodiment, the system includes two or more positioning columns 192, and central support 188. The central support 188 in one embodiment is positioned in the center of the display element 180 and provides a stable point around which the display element tilts. Each positioning column 192 in one embodiment includes an actuator 198, a moving support structure 196, and a tilt top 194.

In one embodiment, the actuator 198 is a piezoelectric element which moves the moving support structure 196 up and down. Alternatively, the actuator 198 may be a magnetic and/or inductive element, nanomotor, electrostatic element, or other actuator mechanism which enables the movement of the moving support structure 196 with the precision and speed needed for a display system.

The moving support structure 196 moves up and down and has attached a tilt-top 194. The tilt top 194 in one embodiment is round or has a rounded top which fits into a notch 190 in the display element 180. In one embodiment, the connection between the moving support structure 196 and the tilt-top 194 is magnetic.

The tilt top 194 enables the display element 180 to be tilted by moving up and down. Because the tilt top 194 is smooth and fits into the notch 190, the tilt top maintains contact with the display element 180.

In one embodiment, the tilt top 194 is a freely rotating sphere, coupled to the moving support structure 196 and the notch 190 via magnetic force. In this way, the system can utilize an actuator with fast up-down motion capabilities to provide a range of motion to the display element 180. The range of motion, and capabilities of the display element are discussed below with respect to the Tables 5 through 6.

Tables 1 and 2 illustrate exemplary optical, physical, and other characteristics for a first configuration of the steerable mirror.

TABLE 1

| | One Embodiment | Comment |
| --- | --- | --- |
| Optical and Physical Characteristics | | |
| Deflection angle | ±12° X axis; ±18° Y axis (mechanical) | At least +/−12 degrees in both axes |
| Full Field of view (geometrical opening angle) | 55° | System also has a 10 mm clear aperture. This refers to full field of view opening when scanning from one extreme to the other. Instantaneous FOV is 10 deg |
| Center of rotation | On mirror center | May be up to 1.35 mm below surface |
| Accuracy vs Set-point (absolute precision) | ±1 arc minutes | Up to ±2 arc minutes |
| Accuracy vs feedback (relative precision) | ±0.25 arc minutes | Up to ±0.33 arc minutes |
| Repeatability RMS (typical) | 0.1 arc minute (30 μrad) | Up to 0.3 arcmin (90 μrad) |
| Beam Stepping Time | | |
| Small step angle (mech.) | 0.5° | No less than 0.35° |
| Small Step Settling criteria accuracy | 97% of position (within 1 arc min of final destination) | 98% of position (within 1 arc min of final destination) |
| Small step settling time | <2 ms | Less than 4 ms |
| Large Step Settling criteria accuracy | 99.9% of position (within 1 arc min) | At least 99.8% of position (within 2 arc min) |
| Large step settling time | <20 ms | Less than 30 ms |
| Mirror diameter | 10 mm diameter | |
| Reflectivity | >95% | |
| Mirror flatness | lambda/4 | |
| Operation wavelength | Visible (450 nm-640 nm) | Short IR (700 nm-800 nm) |
| Typical incident beam diameter | circular, 8 mm | |
| Typical angle of incidence with respect to the vertical reference line | 45° | |

TABLE 2

| | One Embodiment | Comment |
| --- | --- | --- |
| Other Characteristics | | |
| Footprint | 8 mm × 8 mm | Up to 12 mm × 12 mm |
| Height | 2 mm | Up to 5 mm |
| Scanning or point & shoot? | Point and Shoot | |
| Mechanical clamping | Edge slots in packaging | Screws as back up |
| Gravitational influence | None | |
| Magnetic shielding | Not-required | |
| Optical | | |
| Mirror coating | Protected Silver or enhanced aluminum | |
| Optical power | LED illumination, mW range | May include laser illumination |
| Control interface | SPI, I2S, I2C, PWM | |
| Power consumption | <50 mW (DC) | <10 mW (DC) |
| Operating temperature | −20° C. to 65° C. | At least 0° C. to 40° C. |
| Storage temperature | −40° C. to 85° C. | |
| Shock & vibration requirements | Shock according to DIN EN 60068-2-27 | |

TABLE 2-continued

|  | One Embodiment | Comment |
| --- | --- | --- |
| Cycle life | 220 M full cycles | At least 95 M full cycles |
| Life time | 7 years | 3 years |
| Compliance with | RoHS | |

Tables 3 and 4 illustrate exemplary optical, physical, and other characteristics for a second configuration, associated with the steerable positioning element of FIG. 1A.

TABLE 3

|  | One Embodiment | System Design Considerations |
| --- | --- | --- |
| Optical and Physical Characteristics | | |
| Deflection angle | ±8.5° X axis; ±8.5° Y axis (mechanical) | Mirror deflection angle is designed in conjunction with imaging optics to achieve specified visual steerable range. |
| Geometric Open Angle | 120° | This refers to the clear cone angle from the center of rotation of the mirror such that, when scanning from one extreme to the other, no light is obstructed. |
| Center of rotation | Coincident w/surface | The system specifications may allow the center of rotation to be below the mirror surface. |
| Accuracy vs Set-point (absolute precision) | ±0.75 arc min (0.0125°) | Defined over entire steerable range to ensure all desired steerable angles can be reached. This specification is a system level design criteria than can change as imaging optical design varies. |
| Repeatability (Absolute) | ±0.06 arc min (0.001°) | Mirror movements should be highly repeatable to ensure accuracy of system-level calibrations and distortion corrections. This specification is a system level design criteria that can change as imaging optical design varies. |
| Beam Stepping Time | | |
| Small step angle (mech.) | 0.52° | This specification is a system level design criteria that can change as imaging optical design varies. |
| Small Step Settling criteria accuracy | ±0.12 arc min (0.002°) of final target | Final system settling should be undetectable to user. This specification is a system level design criteria than can change as imaging optical design varies. |
| Small step settling time (max) | 4.5 ms | This specification is a system level design criteria that can change as display source and frame rate change. |
| Small step settling time (RMS) | 2.93 ms | |
| Large step angle (mech.) | 10.4° | This specification is a system level design criteria that can change as imaging optical design varies. |
| Large Step Settling criteria accuracy | ±0.25 arc min (0.0042°) of final target | Final system settling should be undetectable to user. This specification is a system level design criteria that can change as imaging optical design varies. In another embodiment, the large step settling criteria accuracy is ±0.12 arc min (0.002°) of final target. |
| Large step settling time | 40 ms (for 10.4°) | |

TABLE 3-continued

|  | One Embodiment | System Design Considerations |
| --- | --- | --- |
| Mirror diameter | 8.2 mm | |
| Reflectivity | >95% | |
| Mirror flatness | lambda/4 | |
| Operation wavelength | Visible (450 nm-640 nm) | In some embodiments, may be used also with Short IR (700 nm-950 nm) |
| Typical incident beam diameter | 4.4 mm | |
| Typical angle of incidence with respect to the vertical reference line | 45° | |

TABLE 4

|  | One Embodiment | Comment |
| --- | --- | --- |
| Other Characteristics | | |
| Footprint | 12.5 mm × 12.5 mm | |
| Height | 4 mm | Up to 5 mm |
| Scanning or point & shoot? | Point and Shoot | |
| Mechanical clamping | 3x Screw mount slots at edge, with locating slots | |
| Gravitational influence | None | |
| Magnetic shielding | Not-required | |
| Optical | | |
| Mirror coating | Protected Silver or enhanced aluminum | |
| Optical power | LED illumination, mW range | May include laser illumination |
| Control interface | SPI, I2S, I2C, PWM | |
| Power consumption | <50 mW (DC) | <10 mW (DC) |
| Operating temperature | −20° C. to 65° C. | At least 0° C. to 40° C. |
| Storage temperature | −40° C. to 85° C. | |
| Shock & vibration requirements | Shock according to DIN EN 60068-2-27 | |
| Cycle life | 220 M full cycles | At least 95 M full cycles |
| Lifetime | 7 years | 3 years |
| Compliance with | RoHS | |

Tables 5 and 6 illustrate exemplary optical, physical, and other characteristics for a third configuration, associated with the steerable positioning element of FIGS. 1E and 1F.

TABLE 5

|  | Functional Ranges | System Design Considerations |
| --- | --- | --- |
| Optical and Physical Characteristics | | |
| Deflection angle | Min: ±2° X axis; ±2° Y axis Max: ±15° X axis; ±15° Y axis (mechanical) | Mirror deflection angle is designed in conjunction with imaging optics to achieve specified visual steerable range. |
| Geometric Open Angle | Min: 60° Max: 160° | This refers to the clear cone angle from the center of rotation of the mirror such that, when scanning from one extreme to the other, no light is obstructed. |

TABLE 5-continued

| | Functional Ranges | System Design Considerations |
|---|---|---|
| Center of Rotation Offset | Min: Coincident w/surface Max: 2 mm | The system specifications may allow the center of rotation to be below the mirror surface. |
| Accuracy vs Set-point (absolute precision) | Min: ±0.05 arc min Max: ±2.0 arc min | Defined over entire steerable range to ensure all desired steerable angles can be reached. This specification is a system level design criteria than can change as imaging optical design varies. |
| Repeatability (Absolute) | Min: ±0.05 arc min Max: ±1.0 arc min | Mirror movements should be highly repeatable to ensure accuracy of system-level calibrations and distortion corrections. This specification is a system level design criteria that can change as imaging optical design varies. |
| Beam Stepping Time | | |
| Small step angle (mech.) | 0.52° | This specification is a system level design criteria that can change as imaging optical design varies. |
| Small Step Settling criteria accuracy | ±0.12 arc min (0.002°) of final target | Final system settling should be undetectable to user. This specification is a system level design criteria than can change as imaging optical design varies. |
| Small step settling time for 0.52° | Min: 1 ms Max: 10 ms | This specification is a system level design criteria that can change as display source and frame rate change. |
| Large step angle (mech.) | 10.4° | This specification is a system level design criteria that can change as imaging optical design varies. |
| Large Step Settling criteria accuracy | ±0.25 arc min (0.0042°) of final target | Final system settling should be undetectable to user. This specification is a system level design criteria that can change as imaging optical design varies. In another embodiment, the large step settling criteria accuracy is ±0.12 arc min (0.002°) of final target. |
| Large step settling time for 10.4° | Min: 5 ms Max: 50 ms | |
| Mirror diameter | Min: 4 mm Max: 15 mm | |
| Operation wavelength | Visible (450 nm-640 nm) | In some embodiments, may be used also with Short IR (700 nm-950 nm) |
| Typical incident beam diameter | Min: 2 mm Max: 8 mm | |
| Typical angle of incidence with respect to the vertical reference line | Min: 20° Max: 60° | |

TABLE 6

| Other Characteristics | Functional Range | Comment |
|---|---|---|
| Footprint | Min: 5 mm × 5 mm Max: 17 mm × 17 mm | |
| Height | Min: 3 mm Max: 8 mm | |
| Scanning or point & shoot? | Point and Shoot | |
| Mechanical clamping | 2x Screw mount slots at edge, with locating slots | |
| Gravitational influence | None | |
| Magnetic Field Compensation | 1-2 aux sensors | |

| Optical | One Embodiment | Comment |
|---|---|---|
| Mirror coating | Protected Silver or enhanced aluminum | |
| Optical power | LED illumination, up to 5W range | May include laser illumination |
| Control interface | SPI, I2S, I2C, PWM | |
| Power consumption | <50 mW (DC) | <10 mW (DC) |
| Operating temperature | −20° C. to 65° C. | At least 0° C. to 40° C. |
| Storage temperature | −40° C. to 85° C. | |
| Shock & vibration requirements | Shock according to DIN EN 60068-2-27 | |
| Cycle life | 220 M full cycles | At least 95 M full cycles |
| Lifetime | 7 years | 3 years |
| Compliance with | RoHS | |

Note that the above tables describe embodiments of mechanical, optical, and physical characteristics that describe a set of embodiments using various configurations of a steerable display element using a mirror as the positioning element. One of skill in the art would understand the modifications which may be made to the above ranges for a different positioning element.

Figure 2:
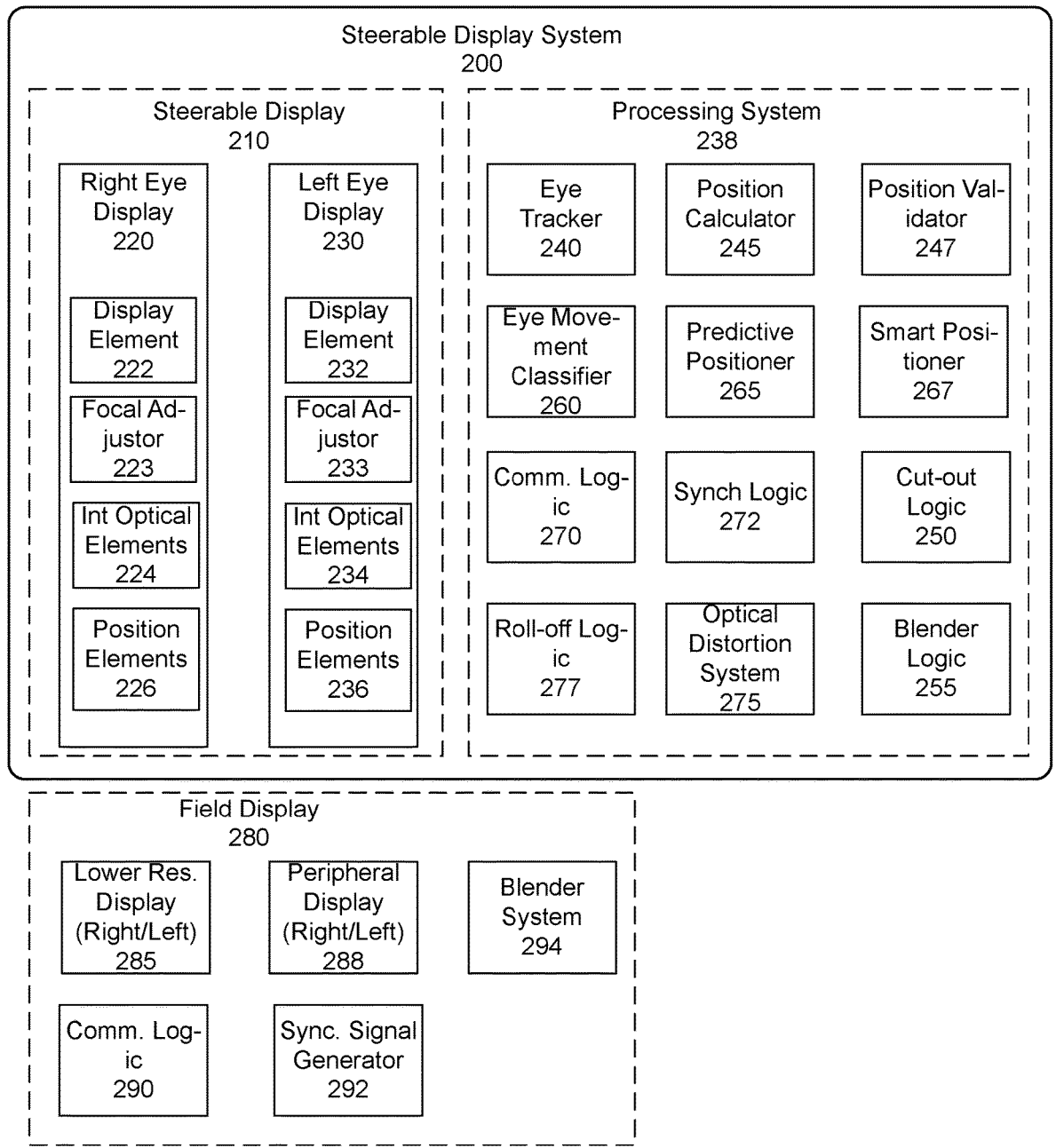
FIG. 2 is a block diagram of one embodiment of the system.

FIG. 2 illustrates one embodiment of the exemplary optical system 210, 280 and associated processing system 238. In one embodiment, the processing system may be implemented in a computer system including a processor. In one embodiment, the processing system 238 may be part of the display system. In another embodiment, the processing system 238 may be remote. In one embodiment, the optical system 210, 280 may be implemented in a wearable system, such as a head mounted display. The steerable display image is presented to the user's eye through a right eye steerable display 220 and left eye steerable display 230, which direct the steerable display. In one embodiment, the steerable displays 220, 230 direct the steerable display image primarily toward the center of the field of view of the user's eye. In another embodiment, the image may be directed to a different location, as will be described below. The steerable display image is a high resolution image, in one embodiment. In one embodiment, the steerable display image is a variable resolution image. In one embodiment, the variable resolution corresponds to the change in the maximum resolution perceived by of the user's eye, which drops off as it moves further from the center.

Figure 3:
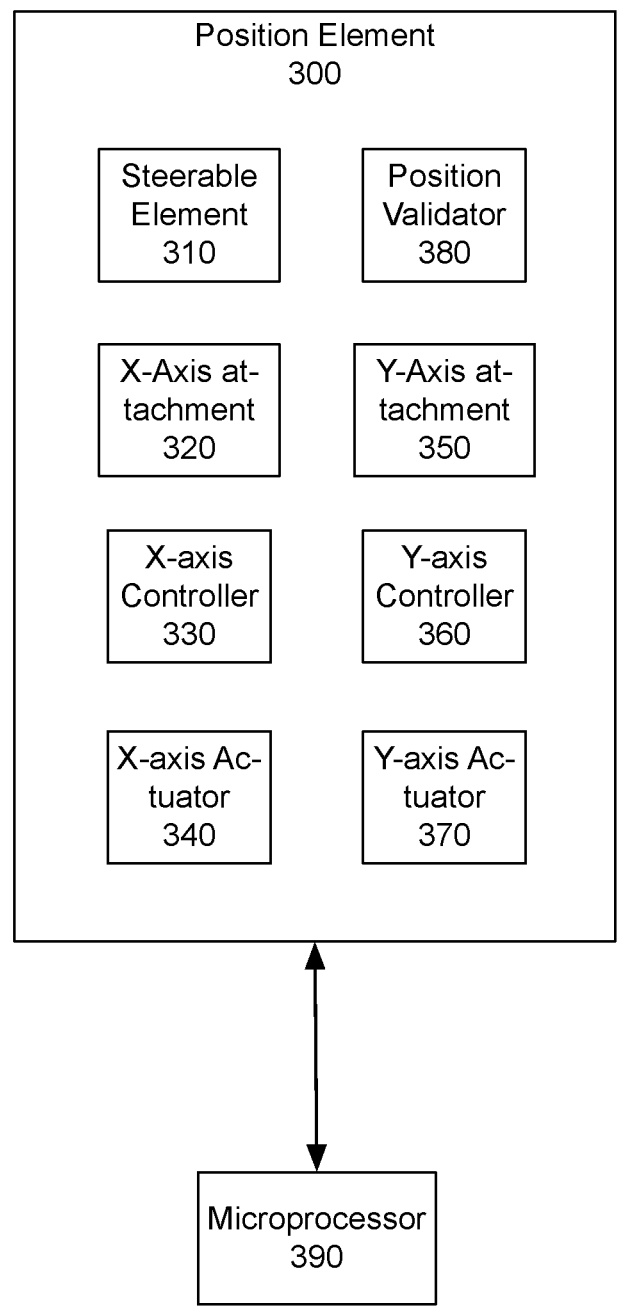
FIG. 3 is a block diagram of one embodiment of the steerable positioning element.

The image for the right eye is created using a first display element 222. In one embodiment, the display element is a digital micromirror device (DMD). In one embodiment, the display element 222 is a scanning micromirror device. In one embodiment, the display element 222 is a scanning fiber device. In one embodiment, the display element is an organic light-emitting diode (OLED). In one embodiment, the display element 222 is a liquid crystal on silicon (LCOS) panel. In one embodiment, the display element 222 is a liquid crystal display (LCD) panel. In one embodiment, the display element 222 is a micro-LED or micro light emitting diode (μLED) panel. In one embodiment, the display element is a scanned laser system. In one embodiment, the system is a hybrid system with an off axis holographic optical element (HOE). In one embodiment, the system includes a waveguide. In one embodiment, the waveguide is a multilayer waveguide. In one embodiment, the display element may include a combination of such elements. FIG. 3 below discusses the display elements in more detail.

In one embodiment, the first display element 222 is located in a near-eye device such as glasses or goggles.

The focus and field of view for the steerable display is set using intermediate optical elements 224. The intermediate optical elements 224 may include but are not limited to, lenses, mirrors, and diffractive optical elements. In one embodiment, the focus of the virtual image is set to infinity. In another embodiment, the focus of the virtual image is set closer than infinity. In one embodiment, the focus of the virtual image can be changed. In one embodiment, the virtual image can have two or more focal distances perceived simultaneously.

In one embodiment, the steerable display image is directed primarily toward the center of the field of view of the user's eye. In one embodiment, the field of view (FOV) of the steerable display image is greater than 1 degree. In one embodiment, the FOV of the steerable display image is between 1 degree and 20 degrees. In one embodiment, the steerable display image may be larger than 5 degrees to address inaccuracies in eye tracking, to provide the region needed to successfully blend such that the user cannot perceive the blending, and to account for the time it takes to reposition the steerable display for the various types of eye movements.

In one embodiment, the system further includes a lower resolution field display image, which has a field of view of 20-220 degrees.

In one embodiment, the steerable display image is projected directly onto the user's eye using a set of one or more totally or partially transparent positioning elements 226. In one embodiment, the positioning elements 226 include a steerable mirror, such as the steerable positioning element shown in FIG. 1A. In one embodiment, the positioning elements 226 include a curved mirror. In one embodiment, the positioning elements 226 include a Fresnel reflector. In one embodiment, the positioning elements 226 include a diffractive element. In one embodiment, the diffractive element is a surface relief grating. In one embodiment, the diffractive element is a volume hologram. In one embodiment, the display 220 may include a focal adjustor 223, which enables the display to show image elements at a plurality of focal distances in the same frame. In one embodiment, the focal adjustor 223 may be an optical path length extender, as described in U.S. patent application Ser. No. 15/236,101 filed on Aug. 12, 2016.

A similar set of elements are present for the left eye steerable display 230. In one embodiment, the right eye steerable display 220 and the left eye steerable display 230 are matched. In another embodiment, they may include different elements.

In one embodiment, an eye tracker 240 tracks the gaze vector of the user, e.g. where the eye is looking. In one embodiment, the eye tracking system is a camera-based eye tracking system 240. In one embodiment, the camera-based eye tracking system 240 includes a holographic optical element. In one embodiment, eye tracking system 240 is an infrared scanning laser with a receiving sensor. In one embodiment, the infrared scanning laser eye-tracking system 240 includes a holographic optical element. In one embodiment, eye tracking system 240 is an optical flow sensor. Other eye tracking mechanisms may be used. Position calculator 245 determines a center of the user's field of view based on data from the eye tracking system 240.

In one embodiment, the adjustable positioning elements 226, 236 are used to adjust the right and left eye steerable display 220, 230 to position the image to be directed primarily toward the center of the field of view of the user's eye. In one embodiment, the adjustable position elements 226, 236 are used to adjust the right and left eye steerable display 220, 230 to position the eye box or exit pupil toward the center of the field of view of the user's eye. In one embodiment, the direction of the image is adjusted by changing the angle of a mirror, one of the position elements 226, 236. In one embodiment, the angle of the mirror is changed by using electromagnetic forces. In one embodiment, the angle of the mirror is changed by using electrostatic forces. In one embodiment, the angle of the mirror is changed by using piezoelectric forces, as illustrated in FIG. 1A. In one embodiment, the adjustable element is the image source, or display element 222, 232 which is moved to position the image. In one embodiment, the image is positioned to be directed to the center of the field of view of the user's eye. In another embodiment, another position element 226, 236 may be changed, such as a steering element 226, 236.

A field display 280 communicates with the processing system 238 via communication logics 270, 290. In one embodiment, there may be multiple displays. Here, two field displays are indicated, field display 285 and peripheral display 288. Additional levels of resolution may also be shown. In one embodiment, the field display 280 may include a single field display 285 viewed by both eyes of the user, or one field display per eye. In one embodiment, the field display 280 may have variable resolution. In one embodiment, the resolution drops off toward the outside of the display 280, corresponding to the drop in the maximum perceived resolution by the eye.

In one embodiment, when the field display 280 is a separate system, sync signal generator 292 is used to synchronize the display of the independent steerable display 210 with the display of the field display 280. In one embodiment, the sync signal generator 292 is used to synchronize the adjustable mirror, or other positioning element of the steerable display with the field display. This results in the synchronization of the displays. In one embodiment, field display 280 includes blender system 294 to blend the edges of the steerable display image with the field display image to ensure that the transition is smooth.

In one embodiment, the lower resolution field display image is presented to the user with a fully or partially transparent optical system. In one embodiment, this partially transparent system includes a waveguide optical system. In one embodiment, this partially transparent system includes a partial mirror which may be flat or have optical power. In one embodiment, this partially transparent system includes a diffractive optical element. In one embodiment, this image is presented to the user through a direct view optical system. In one embodiment, this partially transparent system includes inclusions to reflect or scatter light.

In one embodiment of the field display 280, an additional display sub-system is used to display images in the region of monovision peripheral display 288. In one embodiment, this sub-system is an LED (light emitting diode) array. In one embodiment, this sub-system is an OLED (organic LED) array. In one embodiment, this display sub-system uses a scanned laser. In one embodiment, this sub-system uses an LCD (liquid crystal display) panel. In one embodiment the field display 280 is an LCOS (liquid crystal on silicon)

display. In one embodiment, the field display is a DLP (digital light processing) display. In one embodiment, this sub-system has no intermediate optical elements to manipulate the FOV or focus of the image. In one embodiment, this sub-system has intermediate optical elements. In one embodiment, these intermediate optical elements include a micro-lens array.

The image data displayed by the steerable display 210 and field display 280 are generated by processing system 238. In one embodiment, the system includes an eye tracker 240. In one embodiment, an eye tracker 240 tracks the gaze vector of the user, e.g. where the eye is looking. In one embodiment, the eye tracking system is a camera-based eye tracking system 240. Alternately, eye tracking system 240 may be infrared laser based. Foveal position calculator 245 determines a center of the user's field of view based on data from the eye tracking system 240. In one embodiment, the foveal position calculator 245 additionally uses data from a slippage detection system. Slippage detection in one embodiment detects movement of the headset/goggles on the user's head, and detects slippage or other shifting which displaces the real location of the user's eye from the calculated location. In one embodiment, the foveal position calculator 245 may compensate for such slippage by adjusting the calculated foveal location, used by the system to position steerable display.

The processing system 238 in one embodiment further includes foveal position validator 247 which validates the positioning of the position elements 226, 236, to ensure that the displays 220, 230 are properly positioned. In one embodiment, this includes re-evaluating the steerable display location with respect to the center of the field of view of the user's eye, in light of the movement of the steerable display. In one embodiment, the foveal position validator 247 provides feedback to verify that the positioning element has reached its target location, using a sensing mechanism. The sensing mechanism may be a camera, in one embodiment. The sensing mechanism may be gearing in one embodiment. The sensing mechanism in position validator 247 may be a magnetic sensor. The sensing mechanism may be another type of sensor that can determine the position of the optical element. In one embodiment, if the actual position of the steerable display is not the target position, the foveal position validator 247 may alter the display to provide the correct image data. This is described in more detail below.

In one embodiment, eye movement classifier 260 can be used to predict where the user's gaze vector will move. This data may be used by predictive positioner 265 to move the steerable display 220, 230 based on the next position of the user's gaze vector. In one embodiment, smart positioner 267 may utilize user data such as eye movement classification and eye tracking to predictively position the displays 220, 230. In one embodiment, smart positioner 267 may additionally use data about upcoming data in the frames to be displayed to identify an optimal positioning for the displays 220, 230. In one embodiment, smart positioner 267 may position the display 220, 230 at a position not indicated by the gaze vector. For example, if the displayed frame data has only a small amount of relevant data (e.g. a butterfly illuminated on an otherwise dark screen) or the intention of the frame is to cause the viewer to look in a particular position.

The processing system 238 may further include a cut-out logic 250. Cut-out logic 250 defines the location of the steerable display 220, 230 and provides the display information with the cut-out to the associated field display 280.

The field display 280 renders this data to generate the lower resolution field display image including the cut out of the corresponding portion of the image in the field display. This ensures that there isn't interference between the steerable display image and field image. In one embodiment, when there is a cut-out, blender logic 255 blends the edges of the cutout with the steerable image to ensure that the transition is smooth. In another embodiment, the steerable display may be used to display a sprite, a brighter element overlaid over the lower resolution field image. In such a case, neither the cut out logic 250 nor blender logic 255 is necessary. In one embodiment, the cut out logic 250 and blender logic 255 may be selectively activated as needed.

In one embodiment, the system may synchronize the steerable display 210 with an independent field display 280. In this case, in one embodiment, synchronization logic 272 synchronizes the displays. In one embodiment, the independent field display 280 is synchronized with the adjustable mirror, or other positioning element of the steerable display 210. This results in the synchronization of the displays. The field display 280 may receive positioning data. In one embodiment, there may not be a cutout in this case.

In one embodiment, the processing system 238 may include an optical distortion system 275 for the steerable display 210 with distortion that increases from the center to the edge of the image. This intentional distortion would cause the pixels to increase in perceived size moving from the center of the image to the edge. This change in perceived resolution would reduce the amount of processing required, as fewer pixels would be needed to cover the same angular area of the steerable display image. The optical distortion may help with the blending between the steerable display 210 and the field display 280. In another embodiment, the steerable display 210 including the optical distortion system 275 could be used without a field display. It also provides for an easier optical design, and saves processing on the blending.

In one embodiment, the variable resolution highly distorted image has a large ratio between center and edge. The total FOV of this display would be large (up to 180 degrees).

In one embodiment, roll-off logic 277 provides a roll-off at the edges of the display. Roll-off in one embodiment may include resolution roll-off (decreasing resolution toward the edges of the display area). In one embodiment, this may be implemented with magnification by the optical distortion system 275. Roll-off includes in one embodiment brightness and/or contrast roll off (decreasing brightness and/or contrast toward the edges.) Such roll-off is designed to reduce the abruptness of the edge of the display. In one embodiment, the roll-off may be designed to roll off into "nothing," that is gradually decreased from the full brightness/contrast to gray or black or environmental colors. In one embodiment, roll-off logic 277 may be used by the steerable display 210 when there is no associated field display. In one embodiment, the roll-off logic 297 may be part of the field display 280, when there is a field display in the system.

FIG. 3 illustrates one embodiment of the position elements 300. The position elements in one embodiment include a separate position element for the right eye and the left eye of the user. In one embodiment, rather than having a steerable element 310 for each eye, the system may utilize two or more steerable elements 310 for each eye. In one embodiment, a two element system may include separate steerable elements 310 for the X-axis movement and the Y-axis movement for each eye. In one embodiment, two or more steerable elements 310 may be used, with each steerable element 310 having one or more axes of steerability.

The steerable element 310 may comprise one or more of a mirror, prism, Fresnel lens, or other element which is positioned so that light can be directed to a particular location. In one embodiment, the steerable element 310 is a curved mirror.

The X-axis attachment 320 provides the physical moving element for rotating around the X-axis, while the Y-axis attachment 350 provides the moving element for pivoting around the Y-axis. In one embodiment, the moving elements are pivots 150 and gimbals 155.

The X-axis controller 330 and Y-axis controller 360 control the movement, while the X-axis actuator 340 and Y-axis actuator 370 provide the physical movement. Piezoelectric elements in one embodiment are the controllers. The data for the movement comes from microprocessor 390. In one embodiment, microprocessor 390 is part of the main control circuitry of the steerable display.

In one embodiment, the system also includes a position validator 380 which verifies the actual position of the steerable element 310 along the X and Y axes. In one embodiment, validator 380 comprises a magnetic sensor, which senses the movement of magnets associated with the movable element. In another embodiment, the validator 380 may be coupled to the actuators 340, 370 or attachment 320, 350, and determine the position of the steerable element 310 based on the physical position of the elements supporting the steerable element 310. Other methods of determining the actual position of the steerable element 310 may be used.

In one embodiment, the validator 380 provides data to the microprocessor 390. The microprocessor may compare the data from the controllers 330, 360 with the data from the position validator 380. This may be used for recalibration, as well as to identify issues with the positioning of steerable element 310. In one embodiment, to enable position validator 380, the bottom of the steerable element 310 has markings which are used by position validator 380 to determine the actual position of the steerable element 310.

Figure 4A:
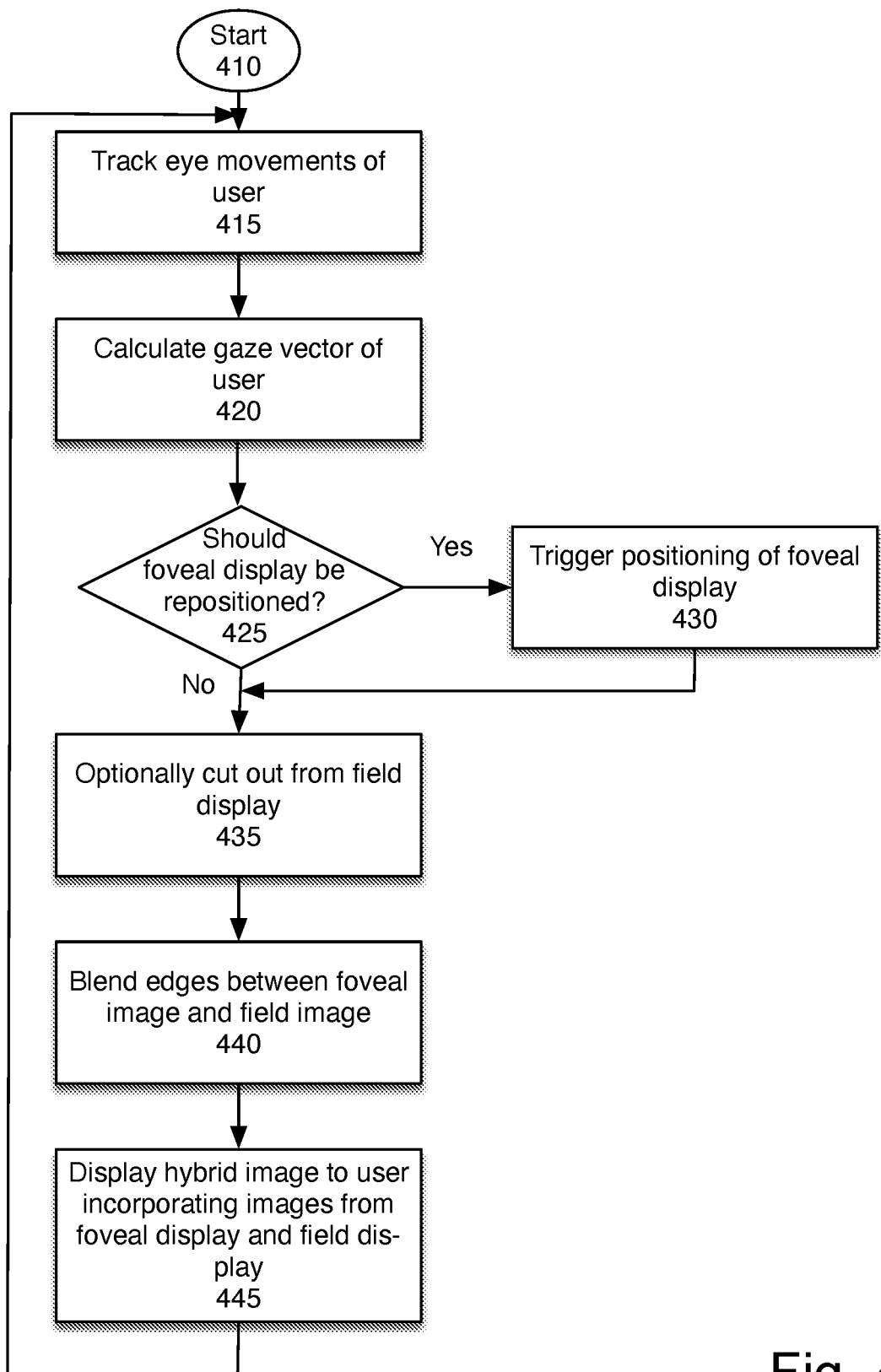
FIG. 4A is a flowchart of one embodiment of using a steerable positioning element.
Figure 4B:
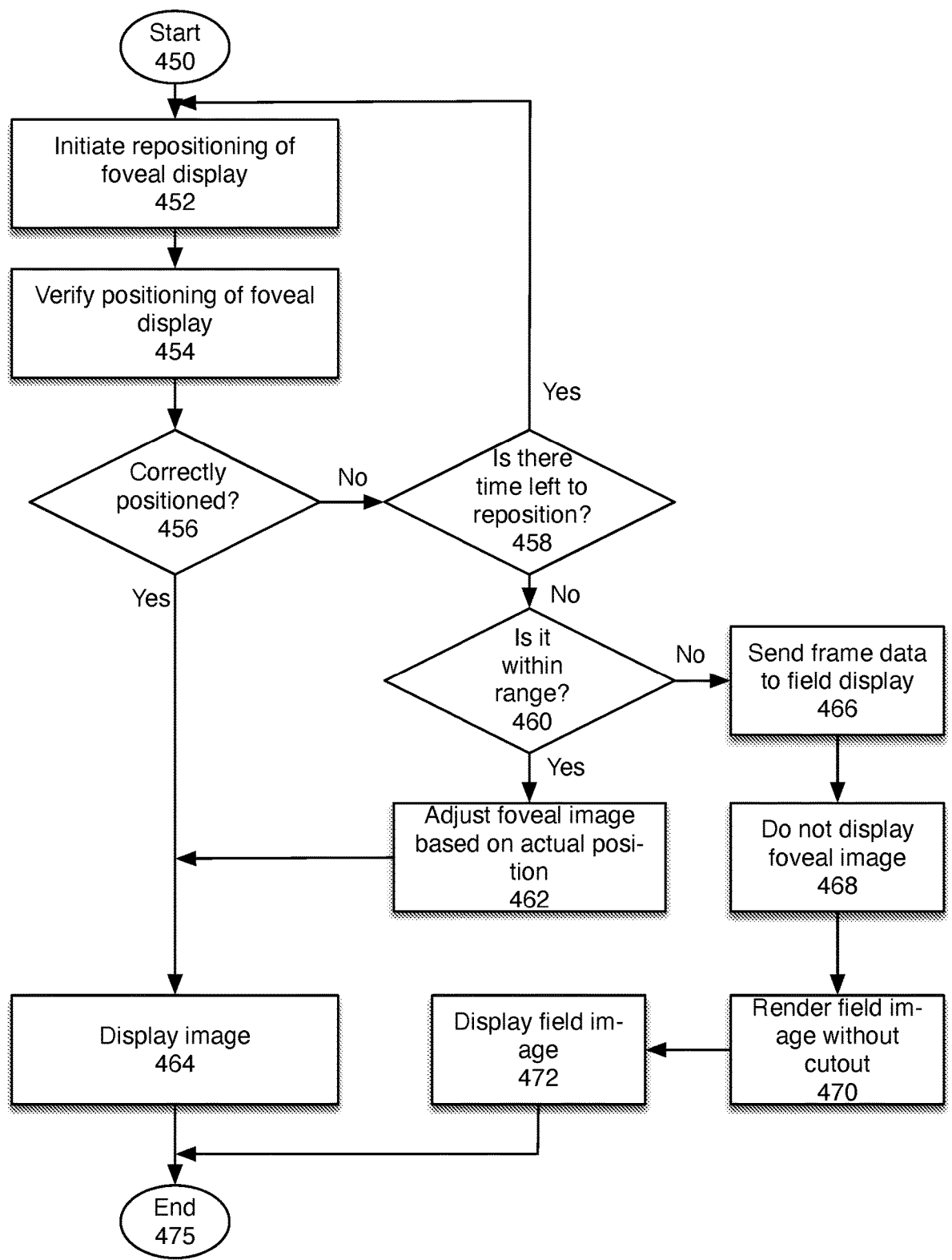
FIG. 4B is a flowchart of one embodiment of positioning verification for the steerable positioning element.
Figure 4C:
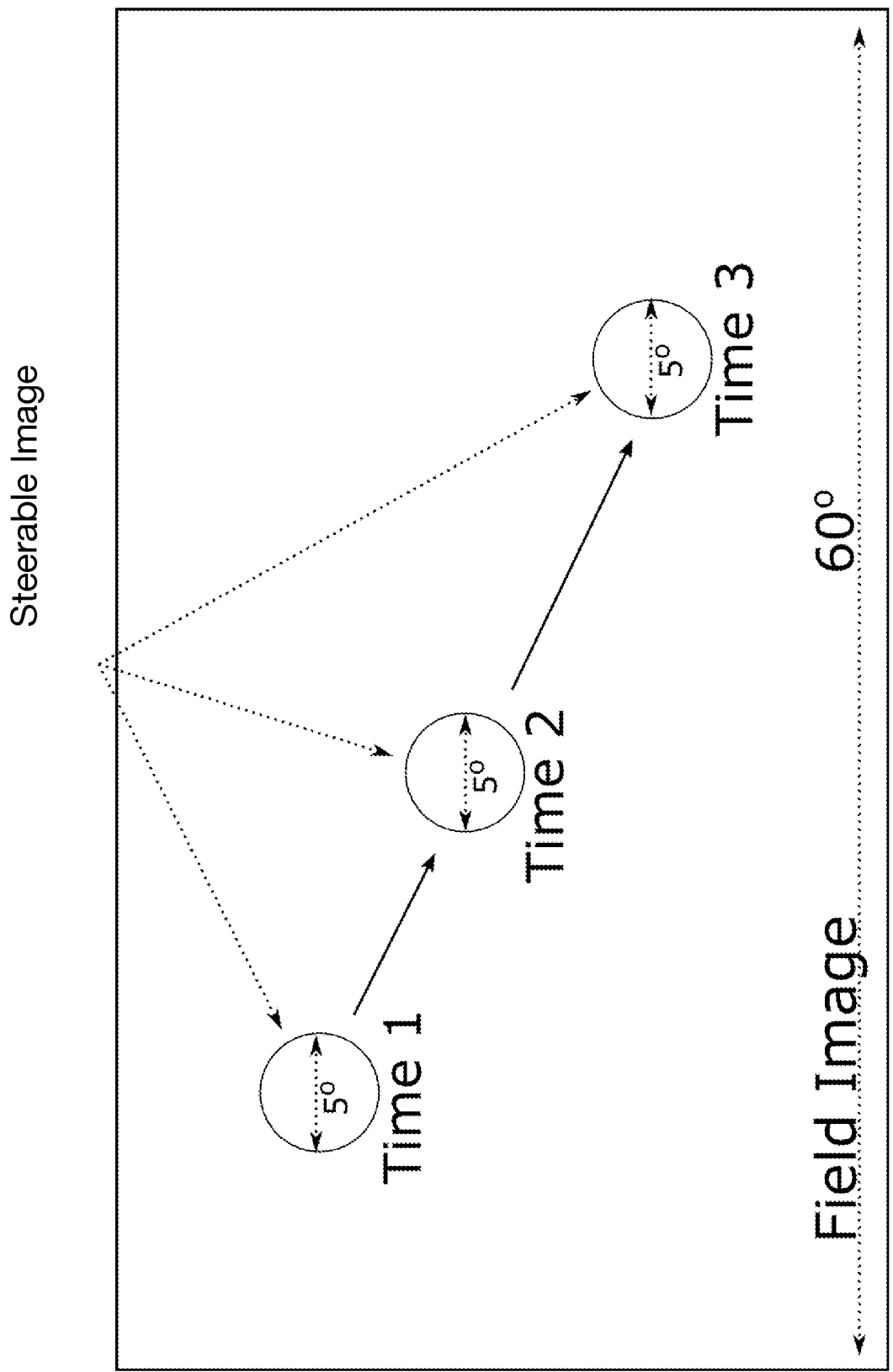
FIG. 4C is an illustration of one embodiment of the movement of the display, in a steerable display.

FIG. 4C illustrates one embodiment of the movement of the display over time. In one embodiment, the movement may correspond to the location of the user's fovea as the user's eye moves. In any time instance, there is a small zone, to which the image is displayed. The location of the 5 degree display of high resolution (in one embodiment) is focused on the center of the user's field of view. In one embodiment, a low resolution field image provides a large field of view. But because the relative resolution of the eye outside the foveal area is lower, the user perceives this combination image, including the small high resolution steerable image and the larger low resolution field image as high resolution across the large field of view.

FIG. 4A is a flowchart of one embodiment of utilizing the steerable display. The process starts at block 410. In one embodiment, prior to the start of this process the display system is fitted to the user. This initial set-up includes determining the interpupillary distance (IPD) and any prescription needed, to ensure that the "baseline" display for the user is accurate.

At block 415, the user's eyes are tracked. In one embodiment, an IR camera is used for tracking eyes. In one embodiment, eye tracking identifies the gaze vector of the user, e.g. where the user is focused.

At block 420, the system calculates the gaze vector of the user. The eye tracking may identify left and right eye gaze vector/angle, and gaze center (derived from the L/R eye gaze vectors). In one embodiment, the eye tracking may determine the location (X, Y, Z) and orientation (roll, pitch, yaw) of the left and right eyes relative to a baseline reference frame. The baseline reference frame is, in one embodiment, established when the display is initially fitted to the user and the user's interpupillary distance, diopters, and other relevant data are established.

At block 420, the location of the fovea is determined based on the gaze vector data. In one embodiment, the fovea location includes coordinates (X, Y, Z) and orientation (roll, pitch, yaw) for each eye.

At block 425, the process determines whether the steerable display should be repositioned. This is based on comparing the current position of the steerable display with the user's gaze vector or the intended position of the image. If they are misaligned, the system determines that the steerable display should be repositioned. If so, at block 430, the display is repositioned. The repositioning of the display is designed so the movement of the steerable display is not perceived by the user. In one embodiment, this may be accomplished by using a mirror that is fast enough to complete the movement in a way that the user cannot perceive it. In one embodiment, this may be accomplished by timing the movement to the user's blink or eye movement. In one embodiment, if the intended display is moved more than a particular distance, the display is blanked during the move. This ensures that the user does not perceive the movement. In one embodiment, the particular distance is more than 0.5 degrees. In one embodiment, the intended display is not blanked if the movement is occurring while the user is blinking. Note that although the term "repositioning" is used, this corresponds to the movement of the positioning elements, to adjust the position of the display.

The process then continues to block 435, whether or not the display was repositioned.

At block 435, optionally the system cuts out the portion of the field display image that would be positioned in the same location as the steerable display image. This prevents the field display from interfering with the steerable display. The cut-out, in one embodiment, is performed at the rendering engine. In another embodiment, the image may be a sprite or other bright image element which does not need a cut-out to be clear. In that instance, this block may be skipped. In one embodiment, the cut-out is skipped if the user eye tracking indicates that the user's gaze has moved substantially from the baseline reference. The baseline reference is the user's default gaze position, from which the movement of the gaze is tracked. A substantial movement from the baseline reference means that the system cannot determine the user's correct gaze position. In this instance, in one embodiment, the steerable display image may be dropped, or the steerable display may be turned off momentarily. In one embodiment, this may be done by blanking the steerable display so that it is not seen by the user. In various embodiments, this may be done by disabling a backlight, disabling laser or LED illumination source, blanking the pixels, or through another method.

At block 440, in one embodiment, the edges between the steerable display image and the field image are blended. This ensures a smooth and imperceptible transition between the field image and the steerable display image. At block 445, the hybrid image is displayed to the user, incorporating the steerable display and the field display. The process then returns to block 410 to continue tracking and displaying. Note that while the description talks about a steerable display image and a field image, the images contemplated include the sequential images of video. Note also that while this description utilizes a combination of the steerable display and a field display in some embodiments, the steerable display may be used without the presence of a field display. In those instances, the process may include only blocks 415 through 430.

FIG. 4B illustrates one embodiment of the corrective actions which may be taken when the display position validation indicates that the actual location of the steerable display does not match the intended location. The process starts at block 450.

At block 452, the steerable display positioning is initiated. In one embodiment, this corresponds to block 430 of FIG. 4A. Returning to FIG. 4B, at block 454, the actual position of the steerable display is verified. In one embodiment, one or more sensors are used to determine the location and orientation of the steerable display. In one embodiment, the sensors may include cameras, mechanical elements detecting the position of the adjustable mirror or other positioning element, etc. This is done, in one embodiment, by the position validator 380 of FIG. 3.

At block 456 the process determines whether the steerable display is correctly positioned. Correct positioning has the steerable display in the calculated location, to display the image in the appropriate location for the user. If the steerable display is correctly positioned, at block 464 the image is displayed. In one embodiment, this includes displaying a hybrid image including the steerable display image in the calculated location and the associated field display image, as discussed above with respect to FIG. 4A. The process then ends at block 475.

If, at block 456, the process determines that the steerable display was not correctly positioned, the process continues to block 458.

At block 458, the process determines whether there is enough time for the steerable display to be repositioned. This determination is based on a distance that needs to be moved, the speed of movement, and time until the next image will be sent by the processing system.

In one embodiment, it also depends on the eye movement of the user. In one embodiment, the system preferentially moves the steerable display while the user is blinking, when no image is perceived. In one embodiment, the repositioning occurs within a blanking period of the display. For example, a movement of just one degree along one coordinate takes less time than moving the steerable display significantly and in three dimensions. If there is enough time, the process returns to block 452 to reposition the steerable display. Otherwise, the process continues to block 460.

At block 460, the process determines whether the actual position of the steerable display is within range of the intended position. In one embodiment, "within range" in this context means that the system is capable of adjusting the display for the difference. If it is within range, the process continues to block 462.

At block 462, the data processed for display on the steerable image is adjusted for rendering in the actual position. The adjusted image is then displayed at block 464. For example, in one embodiment, the original calculated image may be rendered in the wrong location if the position difference is very small, without causing visual artifacts. In another embodiment, the image may be adjusted to render appropriately at the actual location. For example, the image may be cropped, brightened, distorted, contrast adjusted, chromatic coordinate (white point) adjusted, cropped, and laterally shifted to account for the location difference.

In one embodiment, for a hybrid display, the radial location of the edge blending may be shifted or changed. In one embodiment, the system may over-render, e.g. render 5.5 degrees of visual image for a 5-degree steerable display, enabling a shift of 0.5 degrees without needing re-rendering.

If the steerable display is not within range, at block 466, in one embodiment the frame data is sent to the field display for rendering. At block 468, in one embodiment the steerable display image is not displayed. In one embodiment, the frame is dropped. In another embodiment, the steerable display is blanked momentarily. In one embodiment, the steerable display is not considered within range if the user eye tracking indicates that the user's gaze has moved too far outside of the baseline reference.

At block 470, one embodiment, the field display image is rendered, without the image cut-out and without the display or rendering of the steerable display image. At block 472, the field display image is displayed. The process then ends.

Figure 5:
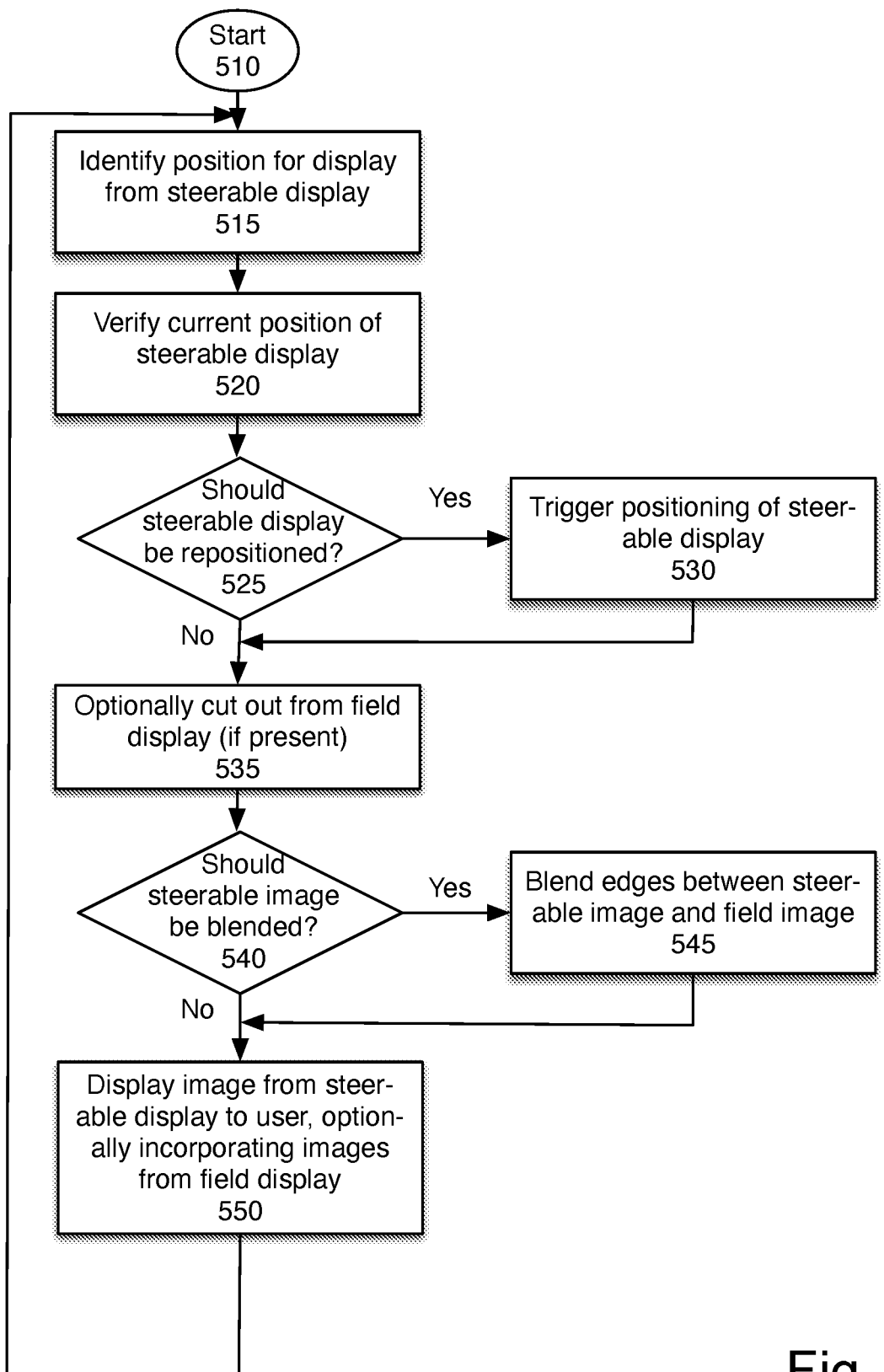
FIG. 5 is a flowchart of another embodiment of using a steerable positioning element.

FIG. 5 is a flowchart of one embodiment of utilizing the steerable display, where positioning is not dependent on the user's gaze vector. This may be applicable, for example, when the display is a heads-up type of display, or a sprite, or the only bright element on an otherwise dark display. Other reasons to provide positioning not based on the user's gaze vector may be found. In one embodiment, this configuration may be combined with the configuration of FIG. 4A discussed above, in which the positioning is based on the gaze vector. That is, the same system may vary between being gaze-vector based and not.

The process starts at block 510. In one embodiment, prior to the start of this process the display system is fitted to the user.

At block 515, the position for the steerable display is determined. This determination may be made based on external data (for example in a virtual reality display), or other determinations. In one embodiment, this decision may be made based on processor data.

At block 520, the process determines the current position of the steerable display.

At block 525, the process determines whether the steerable display should be repositioned. This is based on comparing the current position of the steerable display with the intended position of the image. If they are misaligned, the system determines that the steerable display should be repositioned. If so, at block 530, a display repositioning is triggered. The repositioning of the display is designed so the movement of the steerable display is not perceived by the user, in one embodiment. In one embodiment, this may be accomplished by using a mirror that is fast enough to complete the movement in a way that the user cannot perceive it, as described above. In one embodiment, this may be accomplished by timing the movement to the user's blink or eye movement. In one embodiment, if the intended display is moved more than a particular distance, the display is blanked during the move. This ensures that the user does not perceive the movement. In one embodiment, the particular distance is more than 0.5 degrees. In one embodiment, the intended display is not blanked if the movement is occurring while the user is blinking. Note that although the term "repositioning" is used, this corresponds to the movement of the positioning elements, to adjust the position of the display.

The process then continues to block 535, whether or not the display was repositioned.

At block 535, optionally the system cuts out the portion of the field display image that would be positioned in the same location as the steerable display image. This prevents the field display from interfering with the steerable display.

The cut-out, in one embodiment, is performed at the rendering engine. In another embodiment, the image may be a sprite or other bright image element which does not need a cut-out to be clear. In that instance, this block may be skipped.

At block 540, in one embodiment, the system determines whether the edges between the steerable display image and a field image should be blended. This ensures a smooth and imperceptible transition between the field image and the steerable display image. This may not be relevant when there is no field display, or when the steerable display is a sprite or other overlay element. If the system determines that the edges should be blended, at block 545, the edges are blended.

At block 550, the image from the steerable display is displayed to the user, optionally incorporating data from the field display. The process then returns to block 510 to continue tracking and displaying. Note that while the description talks about a steerable display image and a field image, the images contemplated include the sequential images of video. Note also that while this description utilizes a combination of the steerable display and a field display in some embodiments, the steerable display may be used without the presence of a field display.

Figure 6:
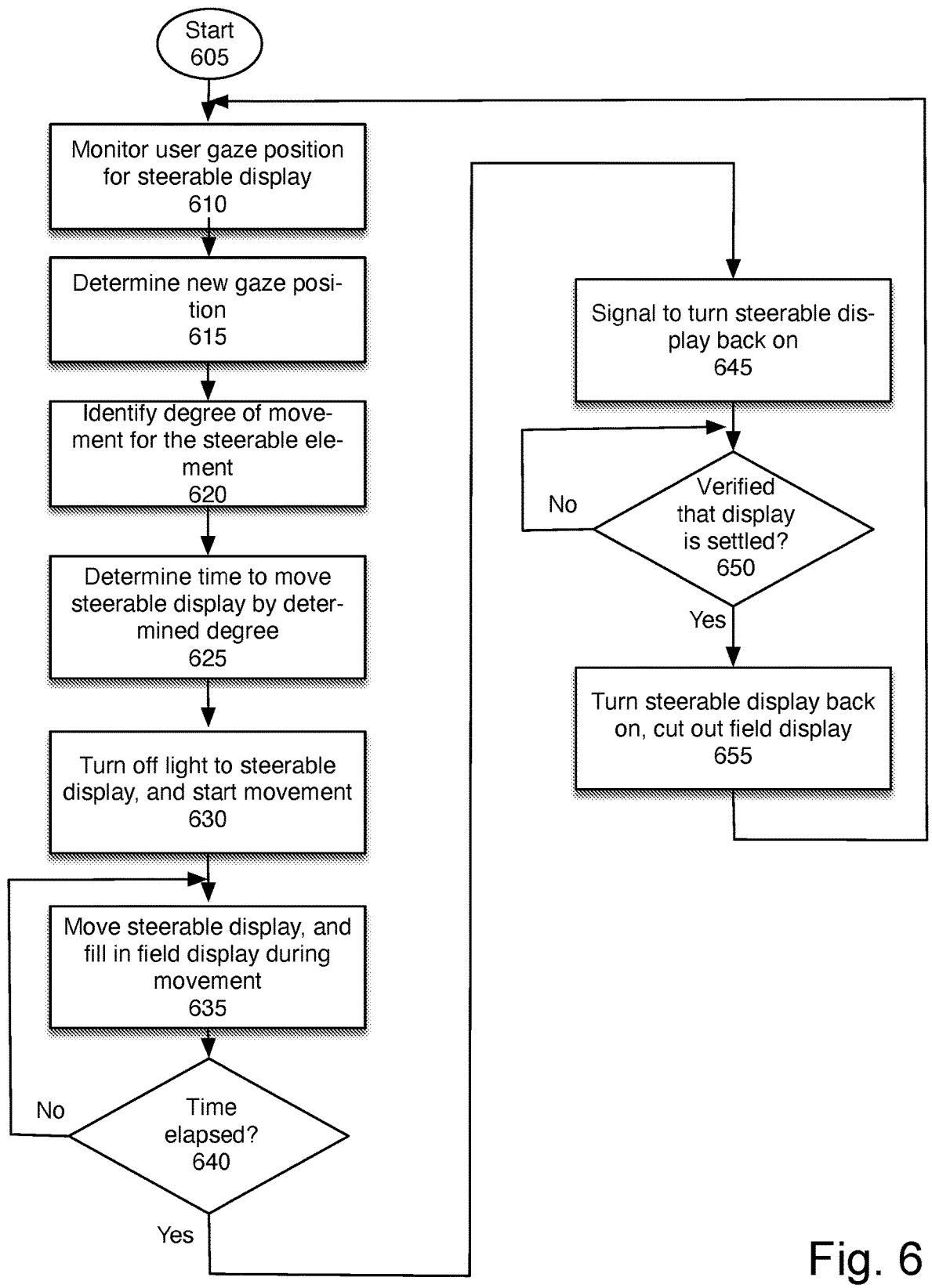
FIG. 6 is a flowchart of one embodiment of controlling the use of the steerable element.

FIG. 6 is a flowchart of one embodiment of controlling the use of the steerable element. In one embodiment, the system determines the type of eye movement, saccade or smooth pursuit. For smooth pursuit, in one embodiment, the system moves one frame at a time, and matches the eye movement so that the steerable display may be on during the movement. In one embodiment, this can be done for up to a three degree per frame movement. For eye movement faster than that, in one embodiment, the steerable display may be blanked. For a saccade movement, in one embodiment the system blanks the steerable display temporarily for movement, to avoid visual aberrations. The system is designed to have a settling time that is faster than the user's eye. Thus, the display is designed to be active again by the time the eye has settled after a saccade movement, and is back to full resolution. FIG. 6 illustrates one embodiment of moving the steerable display for a saccade or other fast movement.

The process starts at block 605. In one embodiment, this process runs whenever the steerable display is active. At block 610, the user's gaze position is monitored for the steerable display. In one embodiment, the steerable display is directed to the user's fovea.

At block 615 a new gaze position is determined. In one embodiment, the gaze position is identified using a camera directed at the user's eye.

At block 620, the degree of movement needed for the steerable display to match the new gaze vector is identified.

At block 625, the time to move the steerable display to the new location is determined. In one embodiment, a look-up table is used. In one embodiment, the "gaze vector" determined may be a plurality of gaze vectors over time, as in a smooth pursuit eye movement.

At block 630, the steerable display is blanked, and the movement is started. In one embodiment, the movement is only started after the steerable display is blanked. The steerable display may be blanked in one embodiment by turning off a light source. In another embodiment the steerable display may be turned off by blanking the mirror. In another embodiment, the steerable display may be blanked by disabling a backlight or illumination. In another embodiment, the steerable display may be blanked by setting the pixels to black.

At block 635, the steerable display is moved. During this time, since the steerable display is blanked, in one embodiment, the field display is filled in to cover the full display area. In another embodiment, there may not be a field display in which case this does not apply.

At block 640, the process determines whether the time has elapsed to complete the calculated movement, in one embodiment. If not, the process continues to move at block 635.

If the time has elapsed, in one embodiment, the system provides a signal to activate the steerable display, at block 645. In another embodiment, the signal timing may be based on the movement data from the microprocessor and position verifier.

When the signal to activate n the display is received, at block 645, at block 650 the process verifies that the display has stopped moving and has settled. Settling means that the display is steady and is not vibrating as a result of the movement. In one embodiment, this is a closed loop determination made by the microprocessor in the display.

If the display has settled, at block 655 the steerable display is activated. In one embodiment, if there is a field display it may be cut out for the area in which the steerable display image is shown. The process then continues to block 610, to continue monitoring the gaze position of the user, and to determine a new gaze position. In this way, the steerable display is moved to match the user's gaze, while providing no visual indicators of movement.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A steerable display system to position an image in a wearable system comprising:
   a positioner to position an image generated by a steerable display, the positioner comprising:
   a steerable element, having a range of motion that enables movement of an image such that the image can be positioned and repositioned at a plurality of locations within a field of view;
   an X-axis controller to pivot the steerable element around an X-axis;
   a Y-axis controller to pivot the steerable element around a Y-axis; and
   a position validator to verify an actual position of the steerable element after the movement;
   the position validator further to adjust steerable display image data when the actual position is not an intended position, without further repositioning the steerable element.

2. The steerable display system of claim 1, wherein the steerable element comprises one or more of: adjustable mirror, tunable prism, acousto-optical modulator, adjustable display panel, a curved mirror, a diffractive element, and a Fresnel reflector.

3. The steerable display system of claim 1 wherein:
   the steerable display has a monocular field of view of at least 1 degree, positioned within a scannable field of view of at least 20 degrees.

4. The steerable display system of claim 1, further comprising:
   an actuator to move the steerable element, the actuator comprising one of a piezo-electric element, a magnetic element, a nanomotor.

5. The steerable display system of claim 4, wherein the actuator has an absolute precision of +/−0.75 arc minute, and a relative precision of 0.06 arc minute.

6. The steerable display system of claim 4, wherein a settling time is less than 2 ms.

7. The steerable display system of claim 1, wherein the steerable element is a mirror having a diameter between 5 mm and 15 mm.

8. The steerable display system of claim 1, wherein the steerable element is smaller than 5 mm×12 mm×12 mm.

9. A steerable display system comprising:
a moveable display element;
a position element to move the moveable display element to position an image generated by the moveable display element, the position element comprising:
flexible arms supporting the moveable display element;
a controller to pivot the moveable display element around an axis using the flexible arm; and
a position validator, to verify an actual position of the moveable display element after the move;
such that the flexible arms have a range of motion that enables the image to be positioned and repositioned at a plurality of locations within a field of view of a user;
the position validator further to adjust steerable display image data when the actual position is not an intended position without further repositioning the moveable display element.

10. The steerable display system of claim 9, wherein the moveable display element comprises one or more of: adjustable mirror, tunable prism, acousto-optical modulator, adjustable display panel, a curved mirror, a diffractive element, and a Fresnel reflector.

11. The steerable display system of claim 9 wherein:
moveable display element has a monocular field of view of at least 1 degree, positioned within a scannable field of view of at least 20 degrees.

12. The steerable display system of claim 9, further comprising:
an actuator to move the moveable display element, the actuator comprising one of a piezo-electric element, a magnetic element, a nanomotor.

13. The steerable display system of claim 12, wherein the actuator has an absolute precision of +/−0.75 arc minute, and a relative precision of 0.06 arc minute.

14. The steerable display system of claim 9, wherein the moveable display element is a mirror having a diameter between 5 mm and 15 mm.

15. The steerable display system of claim 9, wherein the moveable display element is smaller than 5 mm×12 mm×12 mm.

16. A method of positioning an image in a wearable system using a steerable display system, the method comprising:
positioning an image generated by a display, the positioning comprising moving a steerable element, having a range of motion that enables movement of an image such that the image can be positioned and repositioned at a plurality of locations within a field of view utilizing one or more of an X-axis controller and a Y-axis controller,
verifying an actual position of the steerable element after the positioning;
determining that the actual position is not an intended position, and in response, adjusting a steerable display image data without further repositioning the steerable element.

17. The method of claim 16, wherein the verifying comprises reading a signal from a sensor, to determine whether an actual position of the steerable element matches an intended position.

18. The method of claim 17, wherein the verifying comprises utilizing one or more magnetic sensors to sense relative positions of a plurality of magnets coupled to the steerable element.

19. A steerable display system to position an image in a wearable system comprising:
a positioner to position an image generated by a display, the positioner comprising:
a steering mirror, having a range of motion that enables movement of an image such that the image can be positioned and repositioned at a plurality of locations within a field of view;
an X-axis controller to pivot the steering mirror around an X-axis;
a Y-axis controller to pivot the steering mirror around a Y-axis; and
a sensor to determine an actual position of the steering mirror after the movement;
a processor to adjust steerable display image data when the actual position is not an intended position, without further repositioning the steering mirror.

20. The steerable display system of claim 19, further comprising:
an actuator to move the steering mirror, the actuator comprising one of a piezo-electric element, a magnetic element, a nanomotor.

21. The steerable display system of claim 19, further comprising:
when the actual position is not the intended position, the processor to determine whether there is sufficient time to reposition the steering mirror, and when there is not sufficient time to reposition the steering mirror, the processor to adjust steerable display image data.

* * * * *